(12) United States Patent
Morris-Cohen

(10) Patent No.: US 10,903,511 B2
(45) Date of Patent: Jan. 26, 2021

(54) FLOW BATTERIES HAVING ADJUSTABLE CIRCULATION RATE CAPABILITIES AND METHODS ASSOCIATED THEREWITH

(71) Applicant: Lockheed Martin Energy, LLC, Bethesda, MD (US)

(72) Inventor: Adam Morris-Cohen, Concord, MA (US)

(73) Assignee: Lockheed Martin Energy, LLC, Bethesda, MD (US)

( * ) Notice: Subject to any disclaimer, the term of this patent is extended or adjusted under 35 U.S.C. 154(b) by 1094 days.

(21) Appl. No.: 15/364,206

(22) Filed: Nov. 29, 2016

(65) Prior Publication Data

US 2018/0151899 A1    May 31, 2018

(51) Int. Cl.
H01M 8/04276    (2016.01)
H01M 8/04746    (2016.01)
(Continued)

(52) U.S. Cl.
CPC ... *H01M 8/04276* (2013.01); *H01M 8/04186* (2013.01); *H01M 8/04574* (2013.01);
(Continued)

(58) Field of Classification Search
CPC ............ H01M 8/188; H01M 8/04753; H01M 8/04574; H01M 8/04589; H01M 8/04746;
(Continued)

(56) References Cited

U.S. PATENT DOCUMENTS 5,942,102 A    8/1999 Hodges et al.
6,413,410 B1    7/2002 Hodges et al.
(Continued)

FOREIGN PATENT DOCUMENTS

AU    2015216219 A1    8/2016
CA    2236848 A1    5/1997
(Continued)

OTHER PUBLICATIONS

Corcuera et al., "State-of-charge monitoring and electrolyte rebalancing methods for the vanadium redox flow battery," European Chemical Bulletin, 2012, pp. 511-519, vol. 1.
(Continued)

*Primary Examiner* — Jonathan G Jelsma
*Assistant Examiner* — Omar M Kekia
(74) *Attorney, Agent, or Firm* — BakerHostetler

(57) ABSTRACT

The circulation rates of the electrolyte solutions in a flow battery can impact operating performance. Adjusting the circulation rates can allow improved performance to be realized. Flow battery systems having adjustable circulation rates can include a first half-cell containing a first electrolyte solution, a second half-cell containing a second electrolyte solution, at least one pump configured to circulate the first electrolyte solution and the second electrolyte solution at adjustable circulation rates through at least one half-cell in response to a value of $P_{exit}/I$ or $I/P_{enter}$, and at least one sensor configured to measure net electrical power entering or exiting the flow battery system, and an amount of electrical current passing through the whole cell. I is the electrical power passing through the whole cell. $P_{exit}$ is net electrical power exiting the system in a discharging mode, and $P_{enter}$ is net electrical power entering the system in a charging mode.

24 Claims, 9 Drawing Sheets

(51) Int. Cl.
  *H01M 8/04186* (2016.01)
  *H01M 8/04537* (2016.01)
  *H01M 8/18* (2006.01)
  *H01M 8/20* (2006.01)

(52) U.S. Cl.
  CPC ... *H01M 8/04589* (2013.01); *H01M 8/04604* (2013.01); *H01M 8/04746* (2013.01); *H01M 8/04753* (2013.01); *H01M 8/188* (2013.01); *H01M 8/20* (2013.01); *Y02E 60/50* (2013.01)

(58) Field of Classification Search
  CPC ......... H01M 8/04276; H01M 8/04186; H01M 8/20; H01M 8/04604; Y02E 60/528
  USPC .......................................................... 429/51
  See application file for complete search history.

(56) References Cited

U.S. PATENT DOCUMENTS

| | | |
|---|---|---|
| 8,587,255 B2 | 11/2013 | Parakulam et al. |
| 8,980,484 B2 | 3/2015 | Chang et al. |
| 10,290,882 B2 | 5/2019 | Hong et al. |
| 2003/0170906 A1 | 9/2003 | Swain et al. |
| 2005/0158614 A1 | 7/2005 | Hennessy |
| 2006/0049064 A1 | 3/2006 | Horvath et al. |
| 2008/0060196 A1 | 3/2008 | Wang et al. |
| 2008/0193828 A1 | 8/2008 | Sahu |
| 2008/0204708 A1 | 8/2008 | Shaw |
| 2009/0026094 A1 | 1/2009 | Deng et al. |
| 2010/0047671 A1 | 2/2010 | Chiang et al. |
| 2010/0084288 A1 | 4/2010 | Hodges et al. |
| 2011/0081563 A1 | 4/2011 | Christensen et al. |
| 2011/0086247 A1 | 4/2011 | Keshavarz et al. |
| 2011/0223450 A1 | 9/2011 | Horne et al. |
| 2012/0263986 A1 | 10/2012 | Fulop et al. |
| 2013/0011702 A1 | 1/2013 | Horne et al. |
| 2013/0029185 A1 | 1/2013 | Ridley et al. |
| 2013/0084482 A1 | 4/2013 | Chang et al. |
| 2013/0084506 A1 | 4/2013 | Chang et al. |
| 2013/0095362 A1 | 4/2013 | Keshavarz et al. |
| 2013/0149573 A1* | 6/2013 | Krupadanam ........ H01M 8/188 429/63 |
| 2013/0157162 A1 | 6/2013 | Dong et al. |
| 2013/0224538 A1 | 8/2013 | Jansen et al. |
| 2013/0269566 A1 | 10/2013 | Van Polen |
| 2014/0030631 A1 | 1/2014 | Esswein et al. |
| 2014/0238875 A1 | 8/2014 | Bekki et al. |
| 2014/0299014 A1 | 10/2014 | Van Polen |
| 2015/0194685 A1* | 7/2015 | Ballantine ........ H01M 8/04089 429/410 |
| 2015/0210167 A1* | 7/2015 | Suekane ................. B60L 50/50 307/10.1 |
| 2015/0380754 A1* | 12/2015 | Lee ................... H01M 8/04276 429/90 |
| 2016/0049673 A1* | 2/2016 | Fukushima ............ H01M 8/20 429/429 |
| 2016/0111740 A1 | 4/2016 | Spaziante et al. |
| 2016/0164125 A1 | 6/2016 | Pijpers |
| 2016/0254562 A1 | 9/2016 | Morris-Cohen et al. |
| 2016/0293979 A1 | 10/2016 | King et al. |
| 2016/0293991 A1 | 10/2016 | Goeltz et al. |
| 2016/0372777 A1 | 12/2016 | Buckley et al. |
| 2017/0012307 A1 | 1/2017 | Kumamoto et al. |
| 2017/0033391 A1 | 2/2017 | Kumamoto et al. |

FOREIGN PATENT DOCUMENTS

| | | |
|---|---|---|
| CA | 2823963 A1 | 7/2012 |
| CN | 1204400 A | 1/1999 |
| EP | 1998163 A1 | 12/2008 |
| EP | 2648258 A1 | 10/2013 |
| JP | 2004336734 | 11/2004 |
| JP | 2006-351346 A | 12/2006 |
| KR | 20160073444 A | 6/2016 |
| WO | WO-90/03666 A1 | 4/1990 |
| WO | WO-2008/148148 A1 | 12/2008 |
| WO | WO-2010/118175 A2 | 10/2010 |
| WO | WO-2012/094674 A2 | 7/2012 |
| WO | 2016129386 A1 | 8/2016 |

OTHER PUBLICATIONS

Mohamed et al., "Estimating the State-of-Charge of all-Vanadium Redox Flow Battery using a Divided, Open-circuit Potentiometric Cell," Elektronika IR Elektrotechnika, 2013, pp. 39-41, vol. 19.
Pop et al., "State-of-the-art of battery state-of-charge determination," Measurement Science and Technology, 2005, pp. R93-R110, vol. 16.
Skyllas-Kazacos et al., "State of charge monitoring methods for vanadium redox flow battery control," J Power Science, 2011, pp. 8822-8827, vol. 196.
Soloveichik, "Flow Batteries: Current Status and Trends," 2015, Chem. Rev., 115 (20), pp. 11533-11558.
International Search Report and Written Opinion from PCT/US16/65160, dated Feb. 17, 2017.
Extended European Search Report from European Application No. 14858186.1, dated Apr. 26, 2017.
Extended European Search Report from European Patent Application No. 14862634.4, dated May 11, 2017.
Extended European Search Report from European Patent Application No. 15868031.4, dated Jun. 7, 2018, 8 pages.

* cited by examiner

FLOW BATTERIES HAVING ADJUSTABLE CIRCULATION RATE CAPABILITIES AND METHODS ASSOCIATED THEREWITH

CROSS-REFERENCE TO RELATED APPLICATIONS

Not applicable.

STATEMENT REGARDING FEDERALLY SPONSORED RESEARCH OR DEVELOPMENT

Not applicable.

FIELD

The present disclosure generally relates to energy storage and, more specifically, to modifications and techniques for improving the operating performance of flow batteries.

BACKGROUND

Electrochemical energy storage systems, such as batteries, supercapacitors and the like, have been widely proposed for large-scale energy storage applications. Various battery designs, including flow batteries, have been considered for this purpose. Compared to other types of electrochemical energy storage systems, flow batteries can be advantageous, particularly for large-scale applications, due to their ability to decouple the parameters of power density and energy density from one another.

Flow batteries generally include negative and positive active materials in corresponding electrolyte solutions, which are flowed separately across opposing faces of a membrane or separator in an electrochemical cell containing negative and positive electrodes. The terms "membrane" and "separator" are used synonymously herein. The flow battery is charged or discharged through electrochemical reactions of the active materials that occur inside the two half-cells. As used herein, the terms "active material," "electroactive material," "redox-active material" or variants thereof synonymously refer to materials that undergo a change in oxidation state during operation of a flow battery (i.e., during charging or discharging).

Although flow batteries hold significant promise for large-scale energy storage applications, they have historically been plagued by sub-optimal energy storage performance (e.g., round trip energy efficiency) and limited cycle life, among other factors. The operating performance of flow batteries can be impacted by a number of factors including, for example, state of charge (SOC), operating temperature, age of the flow battery and its components, electrolyte flow rates, power and current conditions, and the like. As used herein, the term "state of charge" (SOC) refers to the relative amounts of reduced and oxidized species at an electrode within a given half-cell of a flow battery or other electrochemical system. In many cases, the foregoing factors are not independent of one another, which can make performance optimization very difficult for a flow battery. Despite significant investigational efforts, no commercially viable flow battery technologies have yet been developed. Optimizing the performance of flow batteries due to differing conditions occurring during charging cycles and discharging cycles can be especially problematic to address and another cause of their present lack of commercial viability.

In view of the foregoing, flow batteries and other electrochemical systems configured to provide more optimal performance would be highly desirable in the art. The present disclosure satisfies the foregoing needs and provides related advantages as well.

SUMMARY

In some embodiments, the present disclosure provides flow battery systems including a first half-cell containing a first electrolyte solution, a second half-cell containing a second electrolyte solution, at least one pump configured to circulate the first electrolyte solution through the first half-cell and the second electrolyte solution through the second half-cell, and at least one sensor configured to measure an amount of net electrical power entering or exiting the flow battery system, and an amount of electrical current passing through the whole cell collectively defined by the first half-cell and the second half-cell. The at least one pump is configured to provide a circulation rate that is adjustable through at last one of the first half-cell and the second half-cell and is responsive to a value of $P_{exit}/I$ or $I/P_{enter}$, wherein I is electrical current passing through the whole cell, $P_{exit}$ is net electrical power exiting the flow battery system in a discharging mode, and $P_{enter}$ is net electrical power entering the flow battery system in a charging mode.

In other various embodiments, the present disclosure provides methods for operating a flow battery system to improve operating performance. The methods include providing a flow battery system containing a first half-cell containing a first electrolyte solution, and a second half-cell containing a second electrolyte solution, circulating the first electrolyte solution through the first half-cell and the second electrolyte solution through the second half-cell, measuring an amount of net electrical power entering or exiting the flow battery system, and an amount of electrical current passing through the whole cell collectively defined by the first half-cell and the second half-cell, and adjusting a circulation rate through at least one of the first half-cell and the second half-cell until increasing values of $P_{exit}/I$ or $I/P_{enter}$ occur. I is electrical current passing through the whole cell, $P_{exit}$ is net electrical power exiting the flow battery system in a discharging mode, and $P_{enter}$ is net electrical power entering the flow battery system in a charging mode.

In other various embodiments, the present disclosure provides methods for operating a flow battery system to maintain operating performance. The methods include providing a flow battery system containing a first half-cell containing a first electrolyte solution, and a second half-cell containing a second electrolyte solution, circulating the first electrolyte solution through the first half-cell and the second electrolyte solution through the second half-cell, measuring an amount of net electrical power entering or exiting the flow battery system, and an amount of electrical current passing through the whole cell collectively defined by the first half-cell and the second half-cell, and adjusting a circulation rate through at least one of the first half-cell and the second half-cell in response to decreasing values of $P_{exit}/I$ or $I/P_{enter}$. I is electrical current passing through the whole cell, $P_{exit}$ is net electrical power exiting the flow battery system in a discharging mode, and $P_{enter}$ is net electrical power entering the flow battery system in a charging mode.

The foregoing has outlined rather broadly the features of the present disclosure in order that the detailed description that follows can be better understood. Additional features and advantages of the disclosure will be described hereinafter. These and other advantages and features will become more apparent from the following description.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
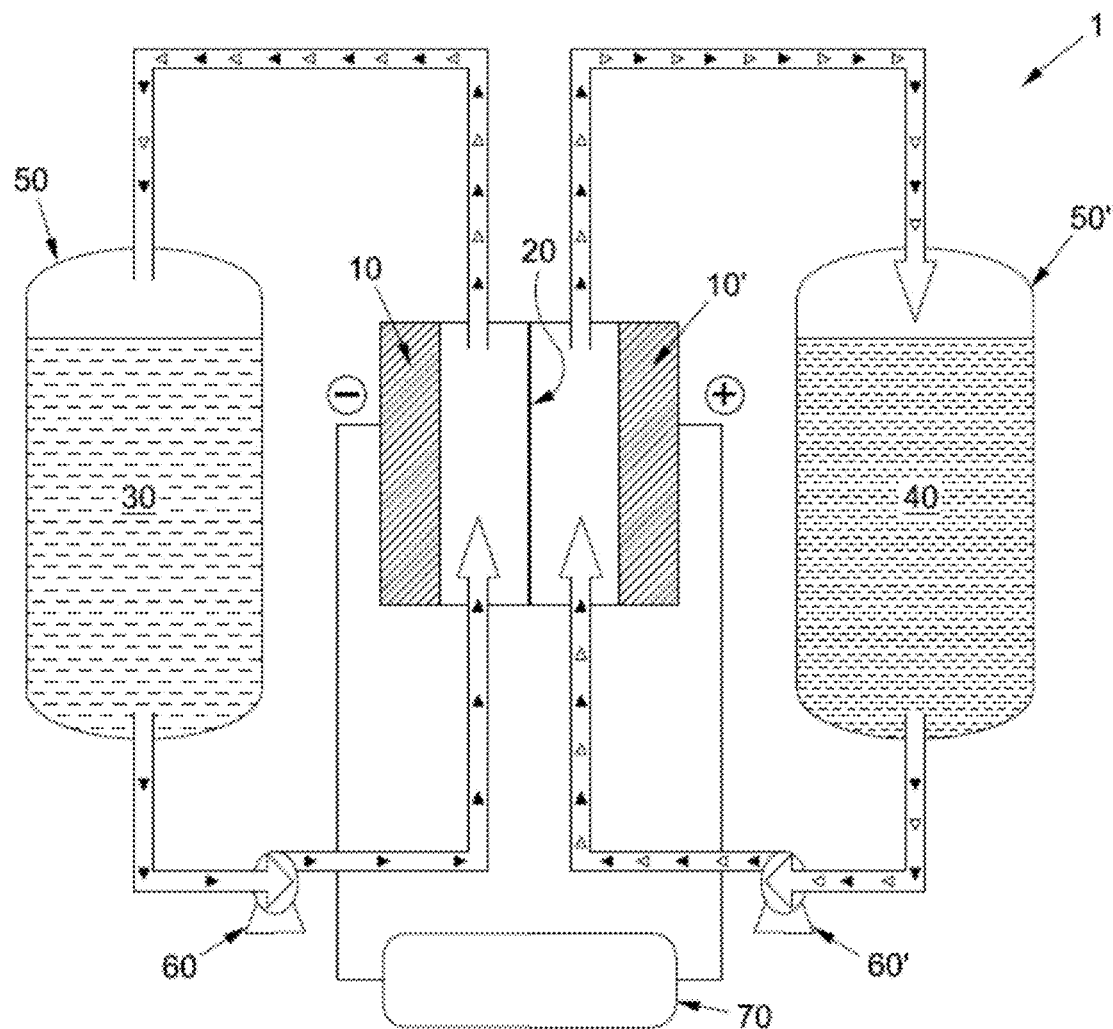
FIG. 1 shows a schematic of an illustrative flow battery containing a single electrochemical cell.

The present disclosure is directed, in part, to flow battery systems that are configured to provide an adjustable circulation rate of at least one electrolyte solution. The present disclosure is also directed, in part, to methods for operating a flow battery system by adjusting the circulation rate of at least one electrolyte solution.

The present disclosure may be understood more readily by reference to the following description taken in connection with the accompanying figures and examples, all of which form a part of this disclosure. It is to be understood that this disclosure is not limited to the specific products, methods, conditions or parameters described and/or shown herein. Further, the terminology used herein is for purposes of describing particular embodiments by way of example only and is not intended to be limiting unless otherwise specified. Similarly, unless specifically stated otherwise, any description herein directed to a composition is intended to refer to both solid and liquid versions of the composition, including solutions and electrolytes containing the composition, and electrochemical cells, flow batteries, and other energy storage systems containing such solutions and electrolytes. Further, it is to be recognized that where the disclosure herein describes an electrochemical cell, flow battery, or other energy storage system, it is to be appreciated that methods for operating the electrochemical cell, flow battery, or other energy storage system are also implicitly described.

It is also to be appreciated that certain features of the present disclosure may be described herein in the context of separate embodiments for clarity purposes, but may also be provided in combination with one another in a single embodiment. That is, unless obviously incompatible or specifically excluded, each individual embodiment is deemed to be combinable with any other embodiment(s) and the combination is considered to represent another distinct embodiment. Conversely, various features of the present disclosure that are described in the context of a single embodiment for brevity's sake may also be provided separately or in any sub-combination. Finally, while a particular embodiment may be described as part of a series of steps or part of a more general structure, each step or sub-structure may also be considered an independent embodiment in itself.

Unless stated otherwise, it is to be understood that each individual element in a list and every combination of individual elements in that list is to be interpreted as a distinct embodiment. For example, a list of embodiments presented as "A, B, or C" is to be interpreted as including the embodiments "A," "B," "C," "A or B," "A or C," "B or C," or "A, B, or C."

In the present disclosure, the singular forms of the articles "a," "an," and "the" also include the corresponding plural references, and reference to a particular numerical value includes at least that particular value, unless the context clearly indicates otherwise. Thus, for example, reference to "a material" is a reference to at least one of such materials and equivalents thereof.

In general, use of the term "about" indicates approximations that can vary depending on the desired properties sought to be obtained by the disclosed subject matter and is to be interpreted in a context-dependent manner based on functionality. Accordingly, one having ordinary skill in the art will be able to interpret a degree of variance on a case-by-case basis. In some instances, the number of significant figures used when expressing a particular value may be a representative technique of determining the variance permitted by the term "about." In other cases, the gradations in a series of values may be used to determine the range of variance permitted by the term "about." Further, all ranges in the present disclosure are inclusive and combinable, and references to values stated in ranges include every value within that range.

As discussed above, energy storage systems that are operable on a large scale while maintaining high efficiency values can be extremely desirable. Flow batteries have generated significant interest in this regard, but there remains considerable room for improving their operating performance. A number of parameters can impact the operating performance of a flow battery, and in many cases these parameters are interdependent upon one another. As a result of the interdependence of various operating parameters, performance optimization of a flow battery under a given set of conditions can sometimes be a very difficult and time-consuming process. Further, as these conditions change during charging or discharging, an initially optimized flow battery can become non-optimized rather quickly as state of charge changes, for example. Aging of the components of a flow battery can similarly affect performance and determine the most efficient operating parameters under a given set of conditions.

The circulation rates of the electrolyte solutions in a flow battery can impact operating performance by affecting internal resistance and electrochemical conversion efficiency within the cell. At low circulation rates, internal resistance of the cell increases due to depletion of active materials in one or more electrochemically active regions of the cell. This type of internal resistance is commonly referred to as mass transport resistance. Parasitic energy losses incurred by operating the pumps at low circulation rates are typically small, however. In contrast, at high circulation rates, the internal resistance of the cell decreases due to ample active materials being delivered to the electrochemically active regions of the cell. However, at high circulation rates, parasitic energy losses increase due to operating the pumps in a manner needed to achieve the high circulation rates. Although it can be understood that resistive losses and fluidic losses vary with electrolyte circulation rates, optimization of the circulation rates can be very difficult to realize due to the interdependence of various flow battery operating parameters, as discussed above.

As a result of the foregoing difficulties, efforts aimed at optimizing flow battery performance have typically focused on operating under conditions of substantially constant stoichiometry or "stoich." As used herein, the term "stoich" refers to the number of moles of active material delivered to a half-cell per unit time divided by the number of moles of electrons passed through the half-cell in the same time interval. Stoich can be held substantially constant by varying the circulation rate of an electrolyte solution as a function of state of charge, thereby providing a fixed amount of the active material to a given half-cell as the state of charge changes. However, state of charge is itself oftentimes a difficult parameter to measure accurately, and maintenance of a substantially constant stoich can be problematic as a result, particularly under real-time operation conditions.

The present inventor recognized that the overall operating efficiency of a flow battery is dictated by a loss function that is equal to the sum of internal electrical resistive losses and fluidic losses of the electrolyte solutions circulating through the two half-cells. Although the loss function is dependent upon a number of interrelated operating parameters, the inventor recognized that the operating efficiency of a flow battery under various conditions could be optimized through independent regulation of the circulation rates of the electrolyte solutions based on routine data feedback, as discussed hereinafter.

Formula 1 approximates the total loss in a flow battery, where minor sources of loss have been omitted for computational simplicity. The minor sources of loss omitted from Formula 1 are not believed to be particularly impacted by electrolyte circulation rates.

$$L_T = L_{pos} + L_{neg} + L_{int} \quad \text{(Formula 1)}$$

$L_T$ is the total resistive loss, $L_{pos}$ is the fluidic loss in the positive half-cell, $L_{neg}$ is the fluidic loss in the negative half-cell, and $L_{int}$ is the internal resistive loss in the flow battery. Substituting expressions for these parameters in Formula 1 provides Formula 2, $$L_T = Q_{pos} dP_{pos}/Z_{pos} Q_{neg} dP_{neg}/Z_{neg} + I^2 R \quad \text{(Formula 2)}$$

where $Q_{pos}$ and $Q_{neg}$ are the respective circulation rates of the electrolyte solutions in the positive and negative half-cells, $dP_{pos}$ and $dP_{neg}$ are the respective differential pressure drops in the positive and negative half-cells, $Z_{pos}$ and $Z_{neg}$ are the pump efficiencies for the respective pump efficiencies for the positive and negative half-cells, I is the electrical current passing through the whole cell defined by the negative and positive half-cells, and R is the internal cell resistance under a given set of conditions. R is a complex function of $Q_{pos}$ and $Q_{neg}$ (i.e., $R(Q_{pos}, Q_{neg})$). The term IR is equivalent to the flow battery's operating voltage less the open circuit voltage, where the open circuit voltage is the difference in half-cell potentials between the positive half-cell and the negative half-cell.

By minimizing the total loss function from Formula 2 above, optimized performance of a flow battery under a given set of conditions can be realized. Since Formula 2 varies in a complex manner with the electrolyte circulation rates under particular operating conditions, it can be somewhat difficult to minimize Formula 2 starting from first principles in order to promote optimized performance. Although all of the parameters specified in Formula 2 can be measured, in practice, it can add to the complexity of constructing and operating a flow battery in order to do so. Thus, although Formula 2 identifies that operating performance can vary with electrolyte solution circulation rates, it does not allow ready optimization to be realized.

The inventor accordingly further recognized that simple ratios varying in proportion to the total loss function could be determined by measuring the net electrical power entering or exiting the flow battery and the current passing through the whole cell defined by the first half-cell and the second half-cell. As used herein, the term "net electrical power" refers to the amount of electrical power supplied from the flow battery during discharging to a load or the electrical grid less the amount of electrical power used for circulating the electrolyte solutions, or the amount of electrical power supplied to the flow battery during recharging plus the amount of electrical power used for circulating the electrolyte solutions. These parameters can be measured readily using standard monitoring equipment, and in many cases, they are already measured as a matter of routine during operation of a flow battery. Thus, the variance of these parameters as a function of the circulation rates can be readily determined, as discussed hereinafter. By extension, variance of the total loss function as a function of the circulation rates can also be ascertained. Although the foregoing operating parameters can be routinely measured, they are not believed to have been utilized previously to promote regulation of the circulation rates of the electrolyte solutions in a flow battery or to promote optimized operation thereof. Furthermore, electronic communication of such operating parameters to the pumps circulating the electrolyte solutions is not believed to have previously been considered.

In particular, the inventor recognized that maximizing the ratio of power:current or current:power is functionally equivalent to minimizing the total loss function of Formulas (1) and (2). The chosen ratio is dependent upon whether the flow battery is in a charging mode or a discharging mode, as discussed hereinafter.

Formula 3 shows the ratio used when the flow battery is in a discharging mode, $$P_{exit}/I \quad \text{(Formula 3)}$$

where $P_{exit}$ is the net electrical power exiting the flow battery (i.e., power received from the flow battery less the power used for operating the pumps) and I is defined as above. Formula 4 shows the ratio used when the flow battery is in a charging mode, $$I/P_{enter} \quad \text{(Formula 4)}$$

where $P_{enter}$ is the net electrical power entering the flow battery (i.e., power supplied to the flow battery plus the power used for operating the pumps) and I is defined as above. As can be inferred from Formula 3, increasing $P_{exit}$ and decreasing the electrical current in the flow battery improves performance by increasing the ratio when the flow battery is in a discharging mode. Similarly, when the flow battery is in a charging mode, it can be inferred from Formula 4 that improved performance can be realized when the electrical current in the flow battery is as large as possible and $P_{enter}$ is as small as possible. In some instances, I, $P_{exit}$ or $P_{enter}$ can be held constant (e.g., at a setpoint value) while the corresponding parameters are being adjusted, where the parameter being held constant is one that is preferable for a given application. Maximizing the value of Formulas 3 or 4 by regulating the circulation rates of the electrolyte solutions is functionally equivalent to minimizing the total loss function from Formulas 1 and 2. Advantageously, the absolute circulation rates do not necessarily need to be determined when minimizing Formulas 3 and 4.

Thus, values for Formulas 3 and 4 can be measured and the circulation rate(s) of the electrolyte solution(s) can then be adjusted, if needed, to improve performance under the operating conditions that are present at a given point in time in the flow battery. For example, the circulation rate(s) of the electrolyte solution(s) can be adjusted to remedy performance changes that occur as the flow battery's state of charge or operating temperature changes. Advantageously, the circulation rates of each electrolyte solution can be varied independently of one another to regulate the overall operating performance. That is, optimization of the circulation rate through one half-cell is not believed to influence the performance of the other half-cell. Therefore, the circulation rates through each half-cell can be optimized sequentially or iteratively to improve the overall flow battery performance.

As alluded to above, measurement of the net electrical power and the electrical current in a flow battery can be measured readily, often rapidly in real-time. As a result, the flow battery systems and methods of the present disclosure can allow correspondingly rapid changes to be made in the circulation rate(s) of the electrolyte solution(s) to address operating performance changes. Advantageously, upon altering the circulation rate of an electrolyte solution, the conditions in a given half-cell re-equilibrate quickly, often within a few seconds. Thus, the rapid parameter measurement and rapid re-equilibration can allow essentially real-time process control to be realized. The rapidity offered by the disclosure herein can allow advantageous direct feedback control between a sensor and a pump in some instances. That is, a pump can be sensitive to or controllable based upon increasing or decreasing values of Formulas 3 and 4 and then adjust circulation rates accordingly to regulate operating performance as rapidly as possible. Appropriate computer hardware and/or software can be implemented for this purpose in some instances. In other instances, a lookup table can be utilized for a given pair of electrolyte solutions in order to optimize performance, where recommended circulation rates in each half-cell have been determined beforehand for various net electrical power and electrical current conditions.

Before discussing further specifics of the flow battery systems and methods of the present disclosure, illustrative flow battery configurations and their operating characteristics will first be described in greater detail hereinafter.

Unlike typical battery technologies (e.g., Ni-metal hydride, lead-acid, and the like), where active materials and other components are housed in a single assembly, flow batteries transport (e.g., via pumping) redox-active energy storage materials from storage tanks through an electrochemical stack containing one or more electrochemical cells. This design feature decouples the electrical energy storage system power from the energy storage capacity, thereby allowing for considerable design flexibility and cost optimization. FIG. 1 shows a schematic of an illustrative flow battery containing a single electrochemical cell. Although FIG. 1 shows a flow battery containing a single electrochemical cell, approaches for combining multiple electrochemical cells together are known and are discussed hereinbelow.

As shown in FIG. 1, flow battery 1 includes an electrochemical cell that features separator 20 between electrodes 10 and 10' of the electrochemical cell. As used herein, the terms "separator" and "membrane" refer to an ionically conductive and electrically insulating material disposed between the positive and negative electrodes of an electrochemical cell. The two terms are used synonymously herein. Electrodes 10 and 10' are formed from a suitably conductive material, such as a metal, carbon, graphite, and the like, and the materials for two can be the same or different. Although FIG. 1 has shown electrodes 10 and 10' as being spaced apart from separator 20, electrodes 10 and 10' can also be abutted with separator 20 in more particular embodiments (see FIG. 2 below). The material(s) forming electrodes 10 and 10' can be porous, such that they have a high surface area for contacting the electrolyte solutions containing first active material 30 and second active material 40, which are capable of being cycled between an oxidized state and a reduced state. For example, one or both of electrodes 10 and 10' can be formed from a porous carbon cloth or a carbon foam in some embodiments.

Pump 60 affects transport of first active material 30 from tank 50 to the electrochemical cell. The flow battery also suitably includes second tank 50' that contains second active material 40. Second active material 40 can be the same material as first active material 30, or it can be different. Second pump 60' can affect transport of second active material 40 to the electrochemical cell. Also shown in FIG. 1 is power source or load 70, which completes the circuit of the electrochemical cell and allows a user to collect or store electricity during its operation. Connection to the electrical grid can also occur at this location. Power or current sensor can be deployed at any suitable location and are not depicted in FIG. 1 in the interest of maintaining generality.

It should be understood that FIG. 1 depicts a specific, non-limiting configuration of a particular flow battery. Accordingly, flow batteries consistent with the spirit of the present disclosure can differ in various aspects relative to the configuration of FIG. 1. As one example, a flow battery system can include one or more active materials that are solids, gases, and/or gases dissolved in liquids. Active materials can be stored in a tank, in a vessel open to the atmosphere, or simply vented to the atmosphere.

As indicated above, multiple electrochemical cells can also be combined with one another in an electrochemical stack in order to increase the rate that energy can be stored and released during operation. The amount of energy released is determined by the overall amount of active material that is present. An electrochemical stack utilizes bipolar plates between adjacent electrochemical cells to establish electrical communication but not fluid communication between the two cells across the bipolar plate. Thus, bipolar plates contain the electrolyte solutions within the individual electrochemical cells. Bipolar plates are generally fabricated from electrically conductive materials that are fluidically non-conductive on the whole. Suitable materials can include carbon, graphite, metal, or a combination thereof. Bipolar plates can also be fabricated from non-conducting polymers having a conductive material dispersed therein, such as carbon particles or fibers, metal particles or fibers, graphene, and/or carbon nanotubes. Although bipolar plates can be fabricated from the same types of conductive materials as can the electrodes of an electrochemical cell, they can lack the continuous porosity permitting an electrolyte solution to flow completely through the latter. It should be recognized that bipolar plates are not necessarily entirely non-porous entities, however. Bipolar plates can have innate or designed flow channels that provide a greater surface area for allowing an electrolyte solution to contact the bipolar plate. Suitable flow channel configurations can include, for example, interdigitated flow channels. In some embodiments, the flow channels can be used to promote delivery of an electrolyte solution to an electrode within the electrochemical cell.

Figure 2:
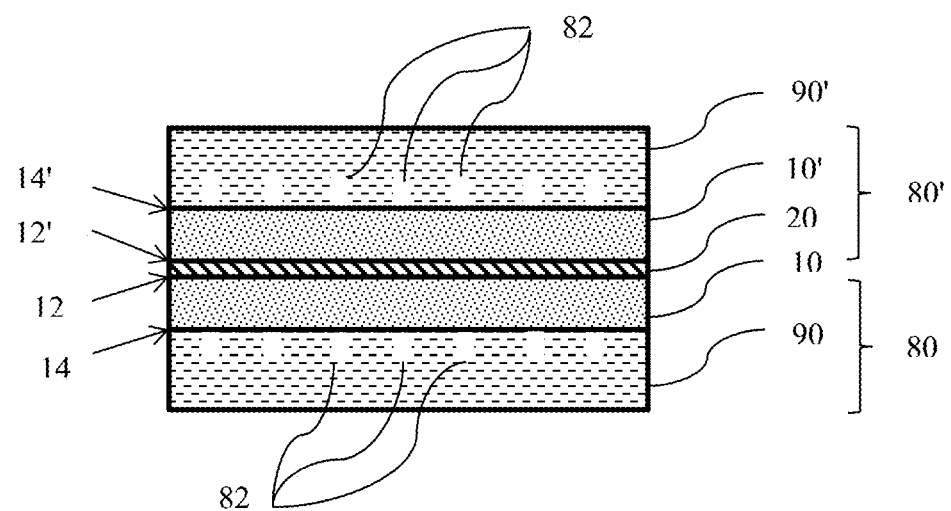
FIG. 2 shows a schematic of an illustrative electrochemical cell configuration containing a bipolar plate abutting each electrode.

FIG. 2 shows a schematic of an illustrative electrochemical cell configuration containing a bipolar plate abutting each electrode. Where appropriate, common reference characters will be used to describe elements shown in a preceding FIGURE. Referring to FIG. 2, negative half-cell 80 and positive half-cell 80' are disposed on opposing sides of separator 20. Negative half-cell 80 contains electrode 10 (i.e., the anode) abutted with separator 20 at interface 12, and bipolar plate 90 is, in turn, abutted against the opposing face of electrode 10 at interface 14. Positive half-cell 80' similarly contains electrode 10' (i.e., the cathode) abutted with the opposing face of separator 20 at interface 12', and bipolar plate 90' is, in turn, abutted against the opposing face of electrode 10' at interface 14'. Flow channels 82 extend partially within the interior of bipolar plates 90 and 90' and increase the degree of contact with the electrolyte solution. In the interest of clarity, the fluid flow details shown in FIG. 1 are not presented in FIG. 2. However, it can be readily appreciated how the electrochemical cell configuration of FIG. 2 would be incorporated in FIG. 1, or how a plurality of electrochemical cells would be incorporated an electrochemical stack and connected to a fluid distribution manifold to deliver an electrolyte solution. For example, a fluid distribution manifold can be connected to an inlet and an outlet on bipolar plates 90 and 90' to supply and remove an electrolyte solution to and from electrodes 10 and 10'.

As indicated above, flow batteries can also include appropriate measuring capabilities or sensors for assaying various operating parameters. Suitable measurement devices will be familiar to one having ordinary scientific skill, and their deployment within a given flow battery can take place at any suitable location. In the interest of generality and clarity, the disposition of sensors and like measurement devices is not depicted in the FIGURES herein. Illustrative parameters that can be measured include, for example, temperature, operating pressure, electrolyte solution circulation rates, operating voltages, operating currents, and net power entering or exiting the flow battery. The latter two parameters are those that are monitored when adjusting electrolyte solution circulation rates according to the various embodiments of the present disclosure. In illustrative embodiments, power can be measured at a meter connected to an electrical grid, where the meter measures power entering or exiting the grid, and electrical current can be measured at an inverter where DC current of the flow battery is converted into AC power for entering the grid.

Accordingly, in various embodiments, flow battery systems of the present disclosure can include a first half-cell containing a first electrolyte solution, a second half-cell containing a second electrolyte solution, at least one pump configured to circulate the first electrolyte solution through the first half-cell and the second electrolyte solution through the second half-cell, and at least one sensor configured to measure an amount of net electrical power entering or exiting the flow battery system, and an amount of electrical current passing through the whole cell collectively defined by the first half-cell and the second half-cell. The at least one pump is configured to provide a circulation rate that is adjustable through at least one of the first half-cell and the second half-cell and is responsive to a value of $P_{exit}/I$ or $I/P_{enter}$, where I is electrical current passing through the whole cell, $P_{exit}$ is net electrical power exiting the flow battery system in a discharging mode, and $P_{enter}$ is net electrical power entering the flow battery system in a charging mode. As used herein, the term "discharging mode" refers to the condition of a flow battery system providing electrical power to a load or grid, such that the state of charge decreases. As used herein, the term "charging mode" refers to the condition of a flow battery system being provided an input of electrical power, such that the state of charge increases.

Numerous types of sensors can be used as the at least one sensor in the various embodiments of the present disclosure. Both multi-parameter (e.g., multimeters) and single-parameter sensors can be suitably used in this regard. Some examples of illustrative sensors that can be suitable for use are discussed hereinafter.

In some embodiments, the at least one sensor can be a single sensor configured to measure both the amount of net electrical power entering or exiting the flow battery system, and the amount of electrical current passing through the whole cell. Multimeters can be suitable in this regard. In some embodiments, a separate sensor can be employed to measure power consumed by the at least one pump. In some or other embodiments, the at least one sensor can be two or more sensors configured to measure separately the amount of net electrical power entering or exiting the flow battery system, and the amount of electrical power passing through the whole cell. The combination of a wattmeter and an ammeter can be suitable in this regard, optionally with a separate sensor for measuring power consumed by the at least one pump. In more particular embodiments, a single- or multi-function wattmeter can be used to measure power, and current can be measured using a thermally calibrated shunt resistor or a Hall transducer.

In some embodiments, the at least one pump and the at least one sensor can be in electronic communication with one another, and the at least one pump can be configured to adjust the circulation rate through at least one of the first half-cell and the second half-cell in response to an input from the at least one sensor. In some embodiments, the at least one pump can be directly responsive to the input from the at least one sensor. In other embodiments, the at least one pump can be controlled using suitable computer hardware and/or software that processes the input from the at least one sensor before providing instructions to the at least one pump. That is, in some embodiments, the input from the at least one sensor can be used to indirectly control the at least one pump via the intervening computer hardware and/or software. Thus, by having the at least one pump and the at least one sensor in electronic communication with one another, rapid adjustment of the circulation rate can be realized. In other instances, suitable computer hardware and/or software can be incorporated directly with the at least one pump.

As indicated above, the flow battery systems of the present disclosure can include at least one pump that is configured to provide an adjustable circulation rate through at least one of the first half-cell and the second half-cell and is responsive to a value of $P_{exit}/I$ or $I/P_{enter}$. In some embodiments, a single pump can be used to affect circulation of both the first electrolyte solution through the first half-cell and the second electrolyte solution through the second half-cell. This configuration does not generally allow independent adjustment of the circulation rates to be realized. For example, a peristaltic pump with separate lines can be used to circulate both electrolyte solutions at the same relative flow rate. In other embodiments, a first pump can be configured to promote circulation of the first electrolyte solution through the first half-cell and a second pump can be configured to promote circulation of the second electrolyte solution through the second half-cell, where one of the first pump or the second pump is configured to provide an adjustable circulation rate. In more specific embodiments, the pump configured to provide the adjustable circulation rate can be responsive to a value of $P_{exit}/I$ or $I/P_{enter}$ as discussed herein. Separate fluid circulation loops through each half-cell can be provided in order to realize separate circulation of the electrolyte solutions.

More advantageously, the at least one pump can be a first pump configured circulate the first electrolyte solution through the first half-cell at a first circulation rate and a second pump configured to circulate the second electrolyte solution through the second half-cell at a second circulation rate, where the first pump and the second pump are each configured to provide an adjustable circulation rate. Both the first pump and the second pump can be responsive to a value of $P_{exit}/I$ or $I/P_{enter}$. Thus, flow battery systems incorporating at least two pumps configured to provide an adjustable circulation rate can enable independent regulation of the circulation rates of the electrolyte solutions to be realized in each half-cell, thereby allowing the contribution of each half-cell toward the operating performance to be improved or maintained. Advantageously, the flow battery systems of the present disclosure can allow improved performance to be realized for any pair of electrolyte solutions, simply by regulating the circulation rate(s) of the electrolyte solution(s) in response to a value of $P_{exit}/I$ or $I/P_{enter}$. With in-process feedback occurring between the at least one sensor and the at least one pump, the chemical identity of the electrolyte solution(s) is not particularly important. In various embodiments, the first circulation rate can be adjusted while the second circulation rate is held constant, or vice versa.

In some embodiments, the first pump can be configured to adjust the first circulation rate until $P_{exit}/I$ or $I/P_{enter}$ reaches a maximum value, and the second pump can be configured to adjust the second circulation rate until $P_{exit}/I$ or $I/P_{enter}$ reaches a maximum value. As indicated above, the first and second pumps can be configured to adjust the first and second circulation rates at different points in time. In more specific embodiments, the at least one pump can be configured to adjust the circulation rate through each half-cell until $P_{exit}/I$ or $I/P_{enter}$ reaches a maximum value.

Although the pump(s) in the flow battery systems of the present disclosure can be configured to provide maximum values of $P_{exit}/I$ or $I/P_{enter}$, thereby achieving optimized operating efficiency, it is to be recognized that any increased value of $P_{exit}/I$ or $I/P_{enter}$ over that originally present in the flow battery systems can improve operating efficiency to some degree. Accordingly, in some embodiments, the at least one pump in the flow battery systems of the present disclosure can be configured to provide increasing values of $P_{exit}/I$ or $I/P_{enter}$ if a full optimization of operating efficiency is not deemed necessary. Less than a full optimization of operating efficiency can be desirable when, for example, acceptable operating efficiency can be readily attained by adjusting the circulation rate(s) but full optimization requires undue labor and/or processing time. Accordingly, in some embodiments, the pump(s) in the flow battery systems of the present disclosure can be configured to provide an increase in operating efficiency of at least about 50%, or at least about 60%, or at least about 70%, or at least about 80%, or at least about 90%, or at least about 100%, or at least about 150%, or at least about 200%. Similarly, the at least one pump can also be responsive to decreasing values of $P_{exit}/I$ or $I/P_{enter}$ if it is desired to maintain the operating performance of the flow battery systems above a threshold level.

Each of the half-cells in the flow battery systems of the present disclosure includes an electrode. In more particular embodiments, one or both of the electrodes in the half-cells can be a carbon electrode, which can be formed from a carbon cloth or a carbon foam in some instances. Numerous examples of carbon cloths or carbon foams suitable for forming a carbon electrode will be familiar to one having ordinary skill in the art.

In some embodiments, the flow battery systems of the present disclosure can include a plurality of electrochemical cells connected in series with one another in an electrochemical stack. The bipolar plates from adjacent electrochemical cells can abut one another, or a bipolar plate can be shared between adjacent electrochemical cells. Additional disclosure is provided above.

In some embodiments, flow battery systems of the present disclosure can include an active material in one or more electrolyte solutions that is a coordination complex. As used herein, the terms "coordination complex" and "coordination compound" refer to any compound having a metal bound to one or more ligands through a covalent bond. Due to their variable oxidation states, transition metals can be highly desirable for use within the active materials of a flow battery system. Cycling between the accessible oxidation states can result in the conversion of chemical energy into electrical energy. Lanthanide metals can be used similarly in this regard in alternative embodiments. Particularly desirable transition metals for inclusion in a flow battery system include, for example, Al, Cr, Ti and Fe. For purposes of the present disclosure, Al is to be considered a transition metal. In some embodiments, coordination complexes within a flow battery system can include at least one catecholate or substituted catecholate ligand. Sulfonated or hydroxylated catecholate ligands can be particularly desirable ligands due to their ability to promote solubility of coordination complexes in which they are present.

Other ligands that can be present in coordination complexes, alone or in combination with one or more catecholate or substituted catecholate ligands, include, for example, ascorbate, citrate, glycolate, a polyol, gluconate, hydroxyalkanoate, acetate, formate, benzoate, malate, maleate, phthalate, sarcosinate, salicylate, oxalate, urea, polyamine, aminophenolate, acetylacetonate, and lactate. Where chemically feasible, it is to be recognized that such ligands can be optionally substituted with at least one group selected from among $C_{1-6}$ alkoxy, $C_{1-6}$ alkyl, $C_{1-6}$ alkenyl, $C_{1-6}$ alkynyl, 5- or 6-membered aryl or heteroaryl groups, a boronic acid or a derivative thereof, a carboxylic acid or a derivative thereof, cyano, halide, hydroxyl, nitro, sulfonate, a sulfonic acid or a derivative thereof, a phosphonate, a phosphonic acid or a derivative thereof, or a glycol, such as polyethylene glycol. Alkanoate includes any of the alpha, beta, and gamma forms of these ligands. Polyamines include, but are not limited to, ethylenediamine, ethylenediamine tetraacetic acid (EDTA), and diethylenetriamine pentaacetic acid (DTPA).

Other examples of ligands can be present include monodentate, bidentate, and/or tridentate ligands. Examples of monodentate ligands that can be present in a coordination complex include, for example, carbonyl or carbon monoxide, nitride, oxo, hydroxo, water, sulfide, thiols, pyridine, pyrazine, and the like. Examples of bidentate ligands that can be present in a coordination complex include, for example, bipyridine, bipyrazine, ethylenediamine, diols (including ethylene glycol), and the like. Examples of tridentate ligands that can be present a coordination complex include, for example, terpyridine, diethylenetriamine, tri azacyclononane, tris(hydroxymethypaininomethane, and the like.

In some embodiments, one or more of the active materials can be coordination complexes having a formula of

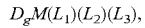
$$D_gM(L_1)(L_2)(L_3),$$

wherein D is an alkali metal ion, an ammonium ion, or any combination thereof, g is an integer or non-integer value ranging between about 1 and about 6, M is a transition metal, and $L_1$-$L_3$ are ligands, such as those defined hereinabove. In some embodiments, at least one of $L_1$-$L_3$ can be a catecholate ligand or substituted catecholate ligand, and in other embodiments, each of $L_1$-$L_3$ is a catecholate ligand or a substituted catecholate ligand. In some or other embodiments, M is Ti. In some or other embodiments, D is a mixture of alkali metal ions, particularly a mixture of sodium ions and potassium ions.

In more particular embodiments, the first electrolyte solution and/or the second electrolyte solution can be an aqueous electrolyte solution. As used herein, the term "aqueous electrolyte solution" refers to a homogeneous liquid phase with water as a predominant solvent in which an active material is at least partially solubilized, ideally fully solubilized. This definition encompasses both solutions in water and solutions containing a water-miscible organic solvent as a minority component of an aqueous phase.

Illustrative water-miscible organic solvents that can be present in an aqueous electrolyte solution include, for example, alcohols and glycols, optionally in the presence of one or more surfactants or other components discussed below. In more specific embodiments, an aqueous electrolyte solution can contain at least about 98% water by weight. In other more specific embodiments, an aqueous electrolyte solution can contain at least about 55% water by weight, or at least about 60% water by weight, or at least about 65% water by weight, or at least about 70% water by weight, or at least about 75% water by weight, or at least about 80% water by weight, or at least about 85% water by weight, or at least about 90% water by weight, or at least about 95% water by weight. In some embodiments, an aqueous electrolyte solution can be free of water-miscible organic solvents and consist of water alone as a solvent.

In further embodiments, an aqueous electrolyte solution can include a viscosity modifier, a wetting agent, or any combination thereof. Suitable viscosity modifiers can include, for example, corn starch, corn syrup, gelatin, glycerol, guar gum, pectin, and the like. Other suitable examples will be familiar to one having ordinary skill in the art. Suitable wetting agents can include, for example, various non-ionic surfactants and/or detergents. In some or other embodiments, an aqueous electrolyte solution can further include a glycol or a polyol. Suitable glycols can include, for example, ethylene glycol, diethylene glycol, and polyethylene glycol. Suitable polyols can include, for example, glycerol, mannitol, sorbitol, pentaerythritol, and tris(hydroxymethyl)aminomethane. Inclusion of any of these components in an aqueous electrolyte solution can help promote dissolution of a coordination complex or similar active material and/or reduce viscosity of the aqueous electrolyte solution for conveyance through a flow battery, for example.

In addition to a solvent and a coordination complex as an active material, an aqueous electrolyte solution can also include one or more mobile ions (i.e., an extraneous electrolyte). In some embodiments, suitable mobile ions can include proton, hydronium, or hydroxide. In other various embodiments, mobile ions other than proton, hydronium, or hydroxide can be present, either alone or in combination with proton, hydronium or hydroxide. Such alternative mobile ions can include, for example, alkali metal or alkaline earth metal cations (e.g., $Li^+$, $Na^+$, $K^+$, $Mg^{2+}$, $Ca^{2+}$ and $Sr^{2+}$) and halides (e.g., $F^-$, $Cl^-$, or $Br^-$). Other suitable mobile ions can include, for example, ammonium and tetraalkylammonium ions, chalcogenides, phosphate, hydrogen phosphate, phosphonate, nitrate, sulfate, nitrite, sulfite, perchlorate, tetrafitioroborate, hexatluorophosphate, and any combination thereof. In some embodiments, less than about 50% of the mobile ions can constitute protons, hydronium, or hydroxide. In other various embodiments, less than about 40%, less than about 30%, less than about 20%, less than about 10%, less than about 5%, or less than about 2% of the mobile ions can constitute protons, hydronium, or hydroxide.

Flow batteries and flow battery systems can provide sustained charge or discharge cycles of several hour durations. As such, they can be used to smooth energy supply/demand profiles and provide a mechanism for stabilizing intermittent power generation assets (e.g., from renewable energy sources such as solar and wind energy). It should be appreciated, then, that various embodiments of the present disclosure include energy storage applications where such long charge or discharge durations are desirable. For example, in non-limiting examples, the flow battery systems of the present disclosure can be connected to an electrical grid to allow renewables integration, peak load shifting, grid firming, baseload power generation and consumption, energy arbitrage, transmission and distribution asset deferral, weak grid support, frequency regulation, or any combination thereof. When not connected to an electrical grid, the flow batteries of the present disclosure can be used as power sources for remote camps, forward operating bases, off-grid telecommunications, remote sensors, the like, and any combination thereof.

In some embodiments, flow batteries can include: a first chamber containing a negative electrode contacting a first aqueous electrolyte solution; a second chamber containing a positive electrode contacting a second aqueous electrolyte solution, and a separator disposed between the first and second aqueous electrolyte solutions. The chambers provide separate reservoirs within the cell, through which the first and/or second electrolyte solutions circulate so as to contact the respective electrodes and the separator. Each chamber and its associated electrode and electrolyte solution define a corresponding half-cell. The separator provides several functions which include, for example, (1) serving as a banter to mixing of the first and second electrolyte solutions, (2) electrically insulating to reduce or prevent short circuits between the positive and negative electrodes, and (3) to facilitate ion transport between the positive and negative electrolyte chambers, thereby balancing electron transport during charge and discharge cycles. The negative and positive electrodes provide a surface where electrochemical reactions can take place during charge and discharge cycles. During a charge or discharge cycle, electrolyte solutions can be transported from separate storage tanks through the corresponding chambers, as shown in FIG. 1. In a charging cycle, electrical power can be applied to the cell such that the active material contained in the second electrolyte solution undergoes a one or more electron oxidation and the active material in the first electrolyte solution undergoes a one or more electron reduction. Similarly, in a discharge cycle the second active material is reduced and the first active material is oxidized to generate electrical power. As discussed hereinabove, adjustment of the circulation rates can promote optimization of this process.

The separator can be a porous membrane in some embodiments and/or an ionomer membrane in other various embodiments. In some embodiments, the separator can be formed from an ionically conductive polymer. Regardless of its type, the separator or membrane can be ionically conductive toward various ions.

Polymer membranes can be anion- or cation-conducting electrolytes. Where described as an "ionomer," the term refers to polymer membrane containing both electrically neutral repeating units and ionized repeating units, where the ionized repeating units are pendant and covalently bonded to the polymer backbone. In general, the fraction of ionized units can range from about 1 mole percent to about 90 mole percent. For example, in some embodiments, the content of ionized units is less than about 15 mole percent; and in other embodiments, the ionic content is higher, such as greater than about 80 mole percent. In still other embodiments, the ionic content is defined by an intermediate range, for example, in a range of about 15 to about 80 mole percent. Ionized repeating units in an ionomer can include anionic functional groups such as sulfonate, carboxylate, and the like. These functional groups can be charge balanced by, mono-, di-, or higher-valent cations, such as alkali or alkaline earth metals. Ionomers can also include polymer compositions containing attached or embedded quaternary ammonium, sulfonium, phosphazenium, and guanidinium residues or salts. Suitable examples will be familiar to one having ordinary skill in the art.

In some embodiments, polymers useful as a separator can include highly fluorinated or perfluorinated polymer backbones. Certain polymers useful in the present disclosure can include copolymers of tetrafluoroethyllene and one or more fluorinated, acid-functional co-monomers, which are commercially available as NAFION™ perfluorinated polymer electrolytes from DuPont. Other useful perfluorinated polymers can include copolymers of tetrafluoroethylene and $FSO_2$—$CF_2CF_2CF_2CF_2$—O—CF=$CF_2$, FLEMION™ and SELEMION™.

Additionally, substantially non-fluorinated membranes that are modified with sulfonic acid groups (or cation exchanged sulfonate groups) can also be used. Such membranes can include those with substantially aromatic backbones such as, for example, polystyrene, polyphenylene, biphenyl sulfone (BPSH), or thermoplastics such as polyetherketones and polyethersulfones.

Battery-separator style porous membranes, can also be used as the separator. Because they contain no inherent ionic conduction capabilities, such membranes are typically impregnated with additives in order to function. These membranes typically contain a mixture of a polymer and inorganic filler, and open porosity. Suitable polymers can include, for example, high density polyethylene, polypropylene, polyyinylidene difluoride (PVDF), or polytetrafluoroethylene (PTFE). Suitable inorganic fillers can include silicon carbide matrix material, titanium dioxide, silicon dioxide, zinc phosphide, and ceria.

Separators can also be formed from polyesters, polyetherketones, poly(vinyl chloride), vinyl polymers, and substituted vinyl polymers. These can be used alone or in combination with any previously described polymer.

Porous separators are non-conductive membranes which allow charge transfer between two electrodes via open channels filled with electrolyte. The permeability increases the probability of active materials passing through the separator from one electrode to another and causing cross-contamination and/or reduction in cell energy efficiency. The degree of this cross-contamination can depend on, among other features, the size (the effective diameter and channel length), and character (hydrophobicity/hydrophilicity) of the pores, the nature of the electrolyte, and the degree of wetting between the pores and the electrolyte.

The pore size distribution of a porous separator is generally sufficient to substantially prevent the crossover of active materials between the two electrolyte solutions. Suitable porous membranes can have an average pore size distribution of between about 0.001 nm and 20 micrometers, more typically between about 0.001 nm and 100 nm. The size distribution of the pores in the porous membrane can be substantial. In other words, a porous membrane can contain a first plurality of pores with a very small diameter (approximately less than 1 nm) and a second plurality of pores with a very large diameter (approximately greater than 10 micrometers). The larger pore sizes can lead to a higher amount of active material crossover. The ability for a porous membrane to substantially prevent the crossover of active materials can depend on the relative difference in size between the average pore size and the active material. For example, when the active material is a metal center in a coordination complex, the average diameter of the coordination complex can be about 50% greater than the average pore size of the porous membrane. On the other hand, if a porous membrane has substantially uniform pore sizes, the average diameter of the coordination complex can be about 20% larger than the average pore size of the porous membrane. Likewise, the average diameter of a coordination complex is increased when it is further coordinated with at least one water molecule. The diameter of a coordination complex of at least one water molecule is generally considered to be the hydrodynamic diameter. In such embodiments, the hydrodynamic diameter is generally at least about 35% greater than the average pore size. When the average pore size is substantially uniform, the hydrodynamic radius can be about 10% greater than the average pore size.

In some embodiments, the separator can also include reinforcement materials for greater stability. Suitable reinforcement materials can include nylon, cotton, polyesters, crystalline silica, crystalline titania, amorphous silica, amorphous titania, rubber, asbestos, wood or any combination thereof.

Separators within the flow batteries of the present disclosure can have a membrane thickness of less than about 500 micrometers, or less than about 300 micrometers, or less than about 250 micrometers, or less than about 200 micrometers, or less than about 100 micrometers, or less than about 75 micrometers, or less than about 50 micrometers, or less than about 30 micrometers, or less than about 25 micrometers, or less than about 20 micrometers, or less than about 15 micrometers, or less than about 10 micrometers. Suitable separators can include those in which the flow battery is capable of operating with a current efficiency of greater than about 85% with a current density of 100 $mA/cm^2$ when the separator has a thickness of 100 micrometers. In further embodiments, the flow battery is capable of operating at a current efficiency of greater than 99.5% when the separator has a thickness of less than about 50 micrometers, a current efficiency of greater than 99% when the separator has a thickness of less than about 25 micrometers, and a current efficiency of greater than 98% when the separator has a thickness of less than about 10 micrometers. Accordingly, suitable separators include those in which the flow battery is capable of operating at a voltage efficiency of greater than 60% with a current density of 100 mA/cm$^2$. In further embodiments, suitable separators can include those in which the flow battery is capable of operating at a voltage efficiency of greater than 70%, greater than 80% or even greater than 90%.

The diffusion rate of the first and second active materials through the separator can be less than about $1\times10^{-5}$ mol cm$^{-2}$ day$^{-1}$, or less than about $1\times10^{-6}$ mol cm$^{-2}$ day$^{-1}$, or less than about $1\times10^{-7}$ mol cm$^{-2}$ day$^{-1}$, or less than about $1\times10^{-9}$ mol cm$^{-2}$ day$^{-1}$, or less than about $1\times10^{-11}$ mol cm$^{-2}$ day$^{-1}$, or less than about $1\times10^{13}$ mol cm$^{-2}$ day$^{-1}$, or less than about $1\times10^{-15}$ mol cm$^{-2}$ day$^{-1}$.

The flow battery systems can also include an external electrical circuit in electrical communication with the first and second electrodes. The electrical circuit can charge and discharge the flow battery during operation. Further exemplary embodiments of a flow battery system provide that (a) the first active material has an associated net positive or negative charge and is capable of providing an oxidized or reduced form over an electric potential in a range of the negative operating potential of the system, such that the resulting oxidized or reduced form of the first active material has the same charge sign (positive or negative) as the first active material and the ionomer membrane also has a net ionic charge of the same sign; and (b) the second active material has an associated net positive or negative charge and is capable of providing an oxidized or reduced form over an electric potential in a range of the positive operating potential of the system, such that the resulting oxidized or reduced form of the second active material has the same charge sign (positive or negative sign) as the second active material and the ionomer membrane also has a net ionic charge of the same sign; or both (a) and (b). The matching charges of the first and/or second active materials and the ionomer membrane can provide a high selectivity. More specifically, charge matching can provide less than about 3%, less than about 2%, less than about 1%, less than about 0.5%, less than about 0.2%, or less than about 0.1% of the molar flux of ions passing through the ionomer membrane as being attributable to the first or second active material. The term "molar flux of ions" refers to the amount of ions passing through the ionomer membrane, balancing the charge associated with the flow of external electricity/electrons. That is, the flow battery is capable of operating with the substantial exclusion of the active materials by the ionomer membrane, and such exclusion can be promoted through charge matching.

Flow battery systems of the present disclosure can have one or more of the following operating characteristics: (a) where, during the operation of the flow battery, the first or second active materials comprise less than about 3% of the molar flux of ions passing through the ionomer membrane; (b) where the round trip current efficiency is greater than about 70%, greater than about 80%, or greater than about 90%; (c) where the round trip current efficiency is greater than about 90%; (d) where the sign of the net ionic charge of the first, second, or both active materials is the same in both oxidized and reduced forms of the active materials and matches that of the ionomer membrane; (e) where the ionomer membrane has a thickness of less than about 100 µm, less than about 75 µm, less than about 50 µm, or less than about 250 µm; (f) where the flow battery is capable of operating at a current density of greater than about 100 mA/cm$^2$ with a round trip voltage efficiency of greater than about 60%; and (g) where the energy density of the electrolyte solutions is greater than about 10 Wh/L, greater than about 20 Wh/L, or greater than about 30 Wh/L.

In some cases, a user may desire to provide higher charge or discharge voltages than are available from a single electrochemical cell. In such cases, several battery cells can be connected in series such that the voltage of each cell is additive. This forms a bipolar stack, also referred to as an electrochemical stack. As discussed herein, a bipolar plate can be employed to connect adjacent electrochemical cells in a bipolar stack, which allows for electron transport to take place but prevents fluid or gas transport between adjacent cells. The positive electrode compartments and negative electrode compartments of individual cells can be fluidically connected via common positive and negative fluid manifolds in the bipolar stack. In this way, individual cells can be stacked in series to yield a voltage appropriate for DC applications or conversion to AC applications.

In additional embodiments, the cells, bipolar stacks, or batteries can be incorporated into larger energy storage systems, suitably including piping and controls useful for operation of these large units. Piping and pumps provide fluid conductivity for moving electrolyte solutions into and out of the respective chambers and storage tanks for holding charged and discharged electrolytes. The cells, cell stacks, and batteries of this disclosure can also include an operation management system. The operation management system can be any suitable controller device, such as a computer or microprocessor, and can contain logic circuitry that sets operation of any of the various valves, pumps, circulation loops, and the like.

In more specific embodiments, a flow battery system can include a flow battery (including a cell or cell stack); storage tanks and piping for containing and transporting the electrolyte solutions; control hardware and software (which may include safety systems); and a power conditioning unit. The flow battery cell stack accomplishes the conversion of charging and discharging cycles and determines the peak power. The storage tanks contain the positive and negative active materials and the tank volume determines the quantity of energy stored in the system. The control software, hardware, and optional safety systems suitably include sensors, mitigation equipment and other electronic/hardware controls and safeguards to ensure sate, autonomous, and efficient operation of the flow battery system. A power conditioning unit can be used at the front end of the energy storage system to convert incoming and outgoing power to a voltage and current that is optimal for the energy storage system or the application. For the example of an energy storage system connected to an electrical grid, in a charging cycle the power conditioning unit can convert incoming AC electricity into DC electricity at an appropriate voltage and current for the cell stack. In a discharging cycle, the stack produces DC electrical power and the power conditioning unit converts it to AC electrical power at the appropriate voltage and frequency for grid applications.

Where not otherwise defined hereinabove or understood by one having ordinary skill in the art, the definitions in the following paragraphs will be applicable to the present disclosure.

As used herein, the term "energy density" refers to the amount of energy that can be stored, per unit volume, in the active materials. Energy density refers to the theoretical energy density of energy storage and can be calculated by Formula 5:

$$\text{Energy density} = (26.8 \text{ A-h/mol}) \times \text{OCV} \times [e^-] \quad (5)$$

where OCV is the open circuit potential at 50% state of charge, (26.8 A-h/mol) is Faraday's constant, and [e$^-$] is the concentration of electrons stored in the active material at 99% state of charge. In the case that the active materials largely are an atomic or molecular species for both the positive and negative electrolyte, [e⁻] can be calculated by Formula 6 as:

$$[e^-] = [\text{active materials}] \times N/2 \qquad (6)$$

where [active materials] is the molar concentration of the active material in either the negative or positive electrolyte, whichever is lower, and N is the number of electrons transferred per molecule of active material. The related term "charge density" refers to the total amount of charge that each electrolyte contains. For a given electrolyte, the charge density can be calculated by Formula 7:

$$\text{Charge density} = (26.8 \text{ A-h/mol}) \times [\text{active material}] \times N \qquad (7)$$

where [active material] and n are as defined above.

As used herein, the term "current density" refers to the total current passed in an electrochemical cell divided by the geometric area of the electrodes of the cell and is commonly reported in units of mA/cm².

As used herein, the term "current efficiency" ($I_{eff}$) is the ratio of the total charge produced upon discharge of a cell to the total charge passed during charging. The current efficiency can be a function of the state of charge of the flow battery. In some non-limiting embodiments, the current efficiency can be evaluated over a state of charge range of about 35% to about 60%.

As used herein, the term "voltage efficiency" is the ratio of the observed electrode potential, at a given current density, to the half-cell potential for that electrode (×100%). Voltage efficiencies can be described for a battery charging step, a discharging step, or a "round trip voltage efficiency." The round trip voltage efficiency ($V_{eff,RT}$) at a given current density can be calculated from the cell voltage at discharge ($V_{discharge}$) and the voltage at charge ($V_{charge}$) using Formula 8:

$$V_{eff,RT} = V_{discharge}/V_{charge} \times 100\% \qquad (8)$$

As used herein, the terms "negative electrode" and "positive electrode" are electrodes defined with respect to one another, such that the negative electrode operates or is designed or intended to operate at a potential more negative than the positive electrode (and vice versa), independent of the actual potentials at which they operate, in both charging and discharging cycles. The negative electrode may or may not actually operate or be designed or intended to operate at a negative potential relative to a reversible hydrogen electrode. The negative electrode is associated with a first electrolyte solution and the positive electrode is associated with a second electrolyte solution, as described herein. The electrolyte solutions associated with the negative and positive electrodes may be described as negolytes and posolytes, respectively.

Having now described flow battery systems of the present disclosure in some detail, illustrative methods for operating the flow battery systems at improved efficiency values will now be described.

In some embodiments, methods of the present disclosure can be conducted to improve the operating performance of a flow battery system. The methods can include: providing a flow battery system including a first half-cell containing a first electrolyte solution and a second half-cell containing a second electrolyte solution, circulating the first electrolyte solution through the first half-cell and the second electrolyte solution through the second half-cell, measuring an amount of net electrical power entering or exiting the flow battery system and an amount of electrical current passing through the whole cell collectively defined by the first half-cell and the second half-cell, and adjusting a circulation rate through at least one of the first half-cell and the second half-cell until increasing values of $P_{exit}/I$ or $I/P_{enter}$ occur. $P_{exit}$, $P_{enter}$ and I are defined as above. As also indicated above, such methods are compatible with any pairing of electrolyte solutions, and allow improved operating performance to be improved for any particular operating conditions.

In some embodiments, the circulation rate through at least one of the half-cells can be adjusted until $P_{exit}/I$ or $I/P_{enter}$ reaches a maximum value. In more particular embodiments, the circulation rate through each half-cell can adjusted until $P_{exit}/I$ or $I/P_{enter}$ reaches a maximum value. In alternative embodiments, the circulation rate through one or both half-cells can be adjusted such that $P_{exit}/I$ or $I/P_{enter}$ increases but does not necessarily reach a maximum value. Simply increasing the value of $P_{exit}/I$ or $I/P_{enter}$ can improve the operating efficiency, even in instances in which a maximum value of neither ratio is reached.

In some embodiments, the methods of the present disclosure can include adjusting the circulation rate through at least one of the half-cells while the flow battery system is in a discharging mode. Accordingly, in such embodiments, the methods can involve adjusting the circulation rate(s) such that $P_{exit}/I$ increases or reaches a maximum value.

In other embodiments, the methods of the present disclosure can include adjusting the circulation rate through at least one of the half-cells while the flow battery system is in a charging mode. Accordingly, in such embodiments, the methods can involve adjusting the circulation rate(s) such that $I/P_{enter}$ increases or reaches a maximum value.

In some embodiments, methods of the present disclosure can include adjusting the circulation rate through at least one of the half-cells as the state of charge of the flow battery system changes. At intermediate states of charge, such as between about 20% and about 80%, or between about 30% and about 70%, or between about 40% and about 60%, for example, the operating efficiency may vary only marginally as the state of change changes, and it may not be necessary to adjust the circulation rates frequently to maintain near-optimal operating performance. However, as the flow battery system nears a state of full charge or full discharge, more frequent optimization of the circulation rates may be needed. Further, depending upon whether the flow battery system is being charged or discharged can impact how the operating performance of the flow battery system varies with changes in state of charge.

In some embodiments, the first electrolyte solution can be circulated through the first half-cell at a first circulation rate and the second electrolyte solution can be circulated through the second half-cell at a second circulation rate. The first circulation rate and the second circulation rate can differ from each other in some embodiments, and in other embodiments, they can be the same or substantially the same. In some embodiments, the first circulation rate and the second circulation rate can be adjusted at the same time.

More desirably, the first circulation rate and the second circulation rate can be adjusted sequentially or iteratively, such as by circulating the first electrolyte solution using a first pump and the second electrolyte solution with a second pump, each pump being configured to provide a circulation rate that is adjustable. That is, the first circulation rate and the second circulation rate can be adjusted independently of one another to allow separate optimization of each. Independent adjustment of the first and second circulation rates can allow a set of desired circulation conditions to be identified for the first half-cell and then a separate set of desired circulation conditions to be identified for the second half-cell. Although there is not believed to be cross-talk between the first half-cell and the second half-cell, continued iterative adjustment of the circulation rates can also be conducted, if desired.

In some embodiments, the methods of the present disclosure can include adjusting the first circulation rate to increase a value of $P_{exit}/I$ or $I/P_{enter}$ and then adjusting the second circulation rate to increase the value of $P_{exit}/I$ or $I/P_{enter}$ further. In some embodiments, the methods of the present disclosure can including adjusting the first circulation rate and the second circulation rate iteratively or sequentially until a maximum value of $P_{exit}/I$ or $I/P_{enter}$ occurs.

In some or other embodiments, the methods of the present disclosure can including adjusting at least one of the first circulation rate and the second circulation rate until an increased value of $P_{exit}/I$ or $I/P_{enter}$ occurs. For example, if one half-cell is already being operated at an optimal or near-optimal circulation rate, the methods described herein can include adjusting the circulation rate in the other half-cell to improve the operating efficiency by increasing or maximizing the value of $P_{exit}/I$ or $I/P_{enter}$.

In some embodiments, the amount of net electrical power entering or exiting the flow battery system and the amount of electrical current passing through the whole cell collectively defined by the first half-cell and the second half-cell can be measured using at least one sensor. In some embodiments, the amount of net electrical power can be measured using a first sensor, and the amount of electrical current can be measured using a second sensor. In other embodiments, the amount of net electrical power and the amount of electrical current can be measured using a single sensor configured to measure both the amount of net electrical power and the electrical current. Suitable sensors for either case have been discussed in more detail above.

In some embodiments, the at least one sensor can be in electronic communication with at least one pump configured to provide a circulation rate that is adjustable, such that the at least one pump is responsive to an input from the at least one sensor. As discussed above, the electronic communication between the at least one pump and the at least one sensor can be direct or indirect. Thus, in some embodiments, methods of the present disclosure can include altering the circulation rate(s) provided by the at least one pump in response to an input of the amount of net electrical power and/or the amount of electrical current received from the at least one sensor. Thus, in such embodiments, real-time or substantially real-time proactive control of the operation of a flow battery system can be realized.

In alternative embodiments, there can be a lack of electronic communication between the at least one pump and the at least one sensor. Although a lack of electronic communication between the at least one pump and the at least one sensor can decrease the speed with which flow battery process control can be realized, effective regulation of the operating efficiency of a flow battery system can still be realized in such embodiments. Specifically, in such embodiments, values for at least I and $P_{exit}$ or $P_{enter}$ can be measured and compared to values in a lookup table for each electrolyte solution. The lookup table for each electrolyte solution can contain a recommended circulation rate for each electrolyte solution for multiple pairs of I and $P_{exit}$ or $P_{enter}$ or the corresponding ratios $P_{exit}/I$ or $I/P_{enter}$. The recommended circulation rates for each electrolyte solution can be determined for a given electrolyte solution before operation of the flow battery system commences. For example, recommended circulation rates can be determined experimentally in a test cell under various operating conditions (e.g., temperature, state of charge, etc.), and the recommended circulation rates can be used for adjusting the circulation rates in an operating flow battery system. If needed, additional regulation of the circulation rates in each half-cell can take place after adjusting the circulation rates obtained from the lookup table. Recalibration can take place as often as necessary, such as once daily, once weekly, or once monthly (e.g., to account for changes in composition or performance as the electrolyte solutions and/or the electrodes age, or if the anticipated operating conditions of the flow battery system extend beyond the calibration range). In any event, the circulation rate for at least one of the first electrolyte solution and the second electrolyte solution can be adjusted manually based upon the recommended circulation rates obtained from the lookup table for each electrolyte solution. Automated reading of the values in a lookup table can also allow more rapid changes in at least one of the circulation rates to take place. Sequential or iterative adjustment of the circulation rates can also take place in such embodiments, until an increased or maximum value of $P_{exit}/I$ or $I/P_{enter}$ occurs.

In alternative embodiments, methods of the present disclosure can be conducted to maintain or restore the operating performance of a flow battery system, such as when the flow battery system's operating efficiency has dropped below a desired threshold value. In such embodiments, the disclosure hereinabove can be implemented to increase the value of $P_{exit}/I$ or $I/P_{enter}$ until a desired threshold value has been exceeded. That is, once a value of $P_{exit}/I$ or $I/P_{enter}$ decreases or drops below the threshold value, the methods of the present disclosure can include adjusting the circulation rate(s) until the desired threshold value of the above ratios has again been exceeded. In some embodiments, adjustment of the circulation rate(s) can be implemented as soon as a decreasing value of $P_{exit}/I$ or $I/P_{enter}$ is observed, and in other embodiments, adjustment of the circulation rates(s) can be implemented once a value of $P_{exit}/I$ or $I/P_{enter}$ drops below the desired threshold value.

Accordingly, in some embodiments, methods of the present disclosure can include: providing a flow battery system including a first half-cell containing a first electrolyte solution and a second half-cell containing a second electrolyte solution, circulating the first electrolyte solution through the first half-cell and the second electrolyte solution through the second half-cell, measuring an amount of net electrical power entering or exiting the flow battery system and an amount of electrical current passing through the whole cell collectively defined by the first half-cell and the second half-cell, and adjusting a circulation rate through at least one of the first half-cell and the second half-cell in response to decreasing values of $P_{exit}/I$ or $I/P_{enter}$ occur. $P_{exit}$, $P_{enter}$ and I are defined as above.

EXAMPLES

A flow battery having an overall active area of 400 cm² was constructed with 1 M NaKTi(catechol)$_2$(gallol) in one half-cell and 1 M Na$_2$K$_2$Fe(CN)$_6$ in the other half-cell. Experimental optimization of the flow battery at 45° C. is described below. Curve fitting of the experimental data was performed with a third-order polynomial fit.

Figure 3:
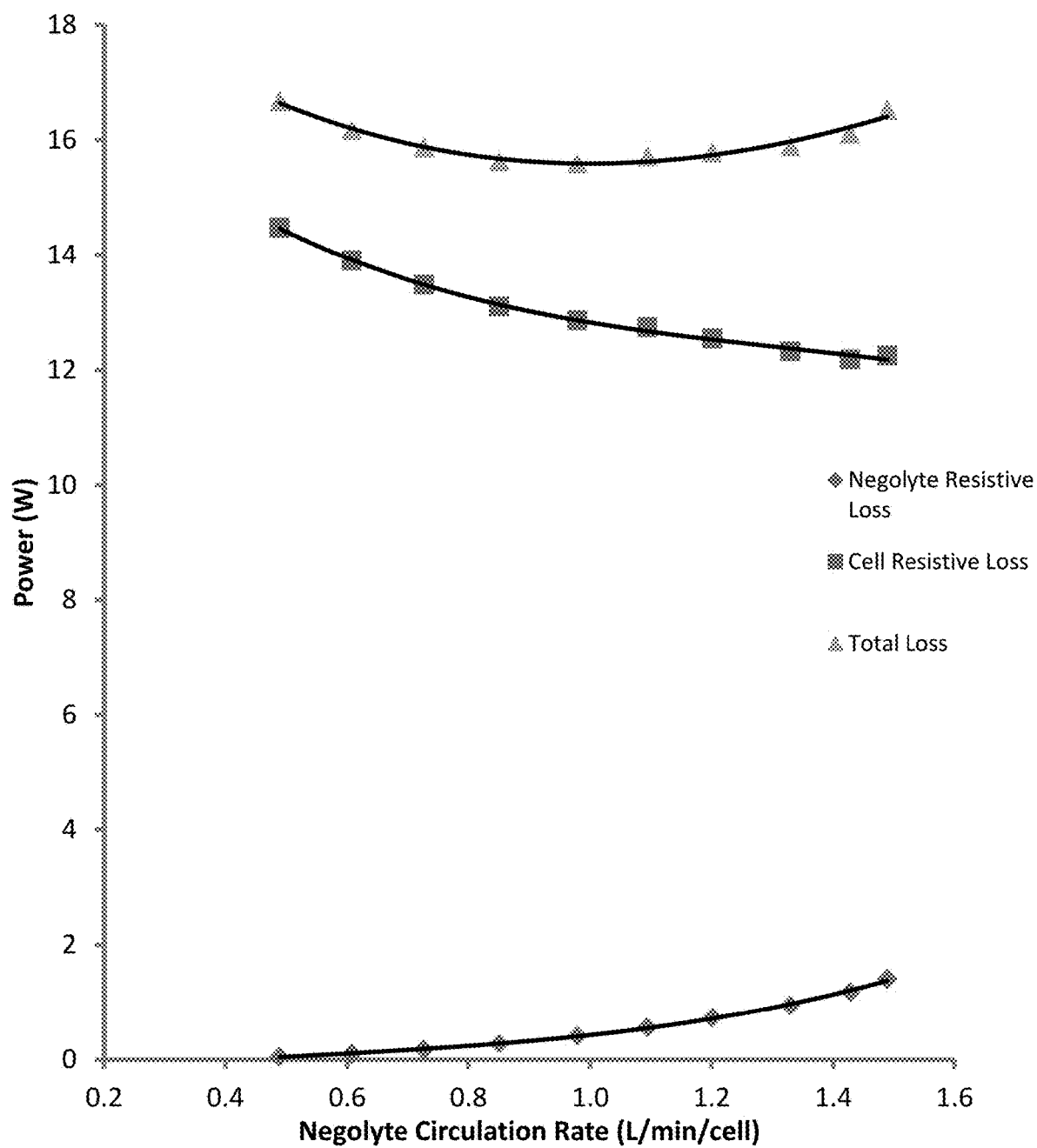
FIG. 3 shows an illustrative plot demonstrating curves for fluidic resistive loss, internal resistive loss, and total resistive loss in a flow battery system.

FIG. 3 shows an illustrative plot demonstrating curves for fluidic resistive loss, internal resistive loss, and total resistive loss in a flow battery system. In this case, the posolyte (i.e., Na$_2$K$_2$Fe(CN)$_6$) circulation rate was held constant at 1.0 L/min/cell at a current density of 150 mA/cm$^2$ while the negolyte circulation rate was varied. The posolyte state of charge was 62% and the negolyte state of charge was 50%. As shown in FIG. 3, fluidic resistive loss increased as a function of the negolyte circulation rate (at a constant posolyte circulation rate), and the internal cell resistance decreased as a function of the negolyte circulation rate. The resistive loss functions offset one another to some degree when summed together and lead to a total loss function that is approximately parabolic in shape. The minimum value for the total loss function corresponds to the circulation rate of the negolyte solution that produces optimal performance (i.e., a maximum value of $P_{exit}/I$ or $I/P_{enter}$) when holding the posolyte circulation rate constant.

Figure 4:
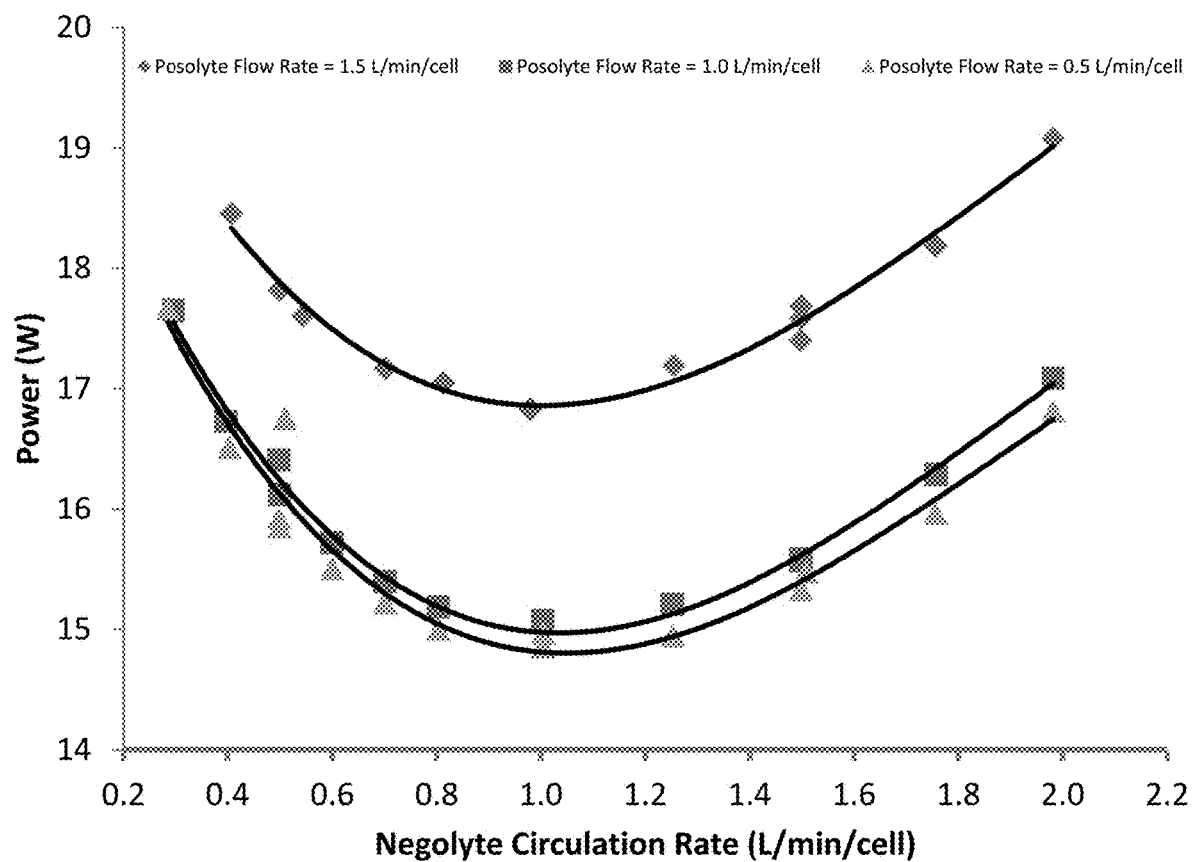
FIG. 4 shows an illustrative plot of total resistive loss in a flow battery system at different posolyte circulation rates.

FIG. 4 shows an illustrative plot of total resistive loss in a flow battery system at different posolyte circulation rates. In this instance, the posolyte circulation rate was fixed at three different values, and the negolyte circulation rate was swept through a rate of values at each posolyte circulation rate. The current density was again 150 mA/cm$^2$, the posolyte state of charge was 62%, and the negolyte state of charge was 50%. As shown in FIG. 3 in the preceding example, the optimal negolyte circulation rate in the flow battery system was approximately 1.0 L/min/cell. When the posolyte circulation rate was then fixed at three different values and the negolyte circulation rate was swept over a range of values (see FIG. 4), the total loss function was minimized at essentially the same negolyte circulation rate as identified previously in FIG. 3. As also shown in FIG. 4, a posolyte circulation rate of 0.5 L/min/cell afforded slightly more efficient operating performance than did a posolyte circulation rate of 1.0 L/min/cell. At a posolyte circulation rate of 1.5 L/min/cell, the total loss function was much higher, indicating a less efficient state of operation. Thus, FIGS. 3 and 4 collectively demonstrate that the circulation rates of the two electrolyte solutions can be optimized essentially independently of one another.

Figure 5A:
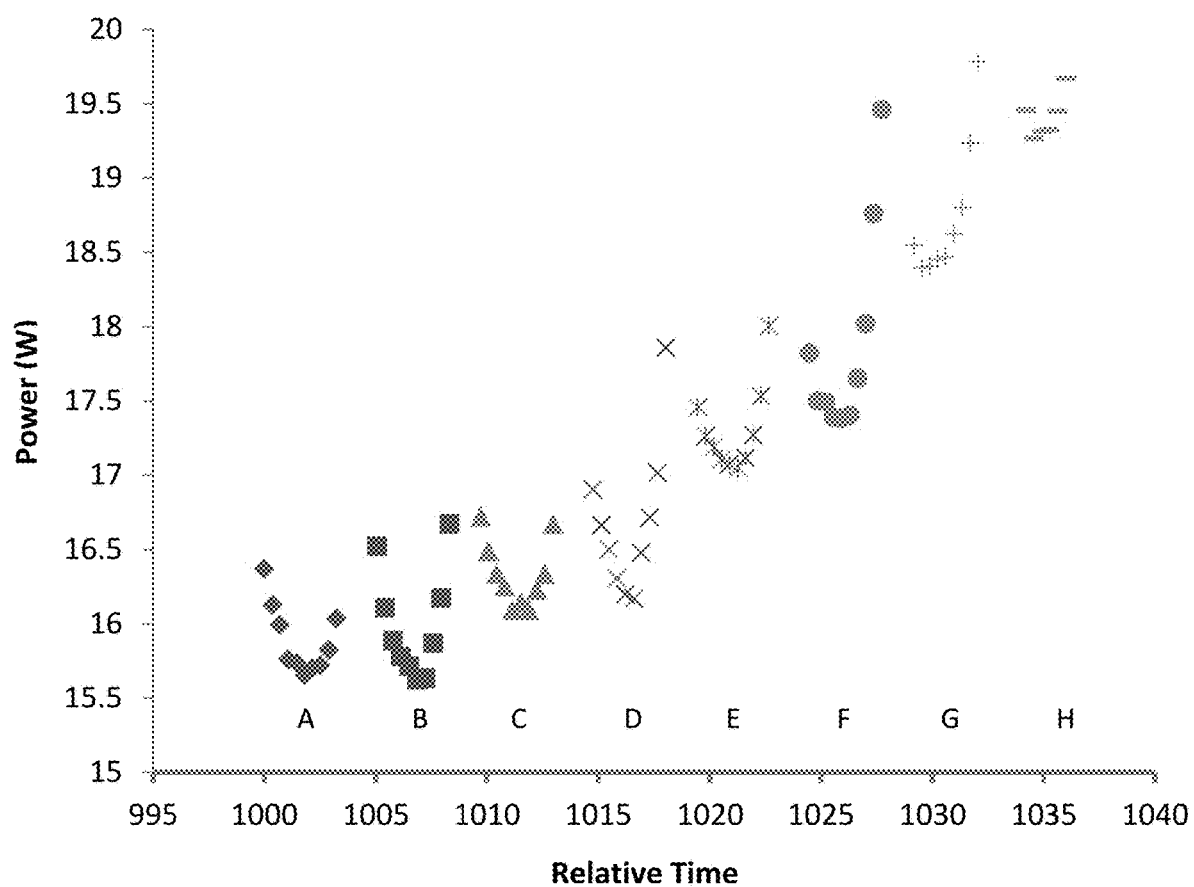
FIGS. 5A and 5B show illustrative plots demonstrating how the total loss function in a flow battery system can be minimized over time.
Figure 5B:
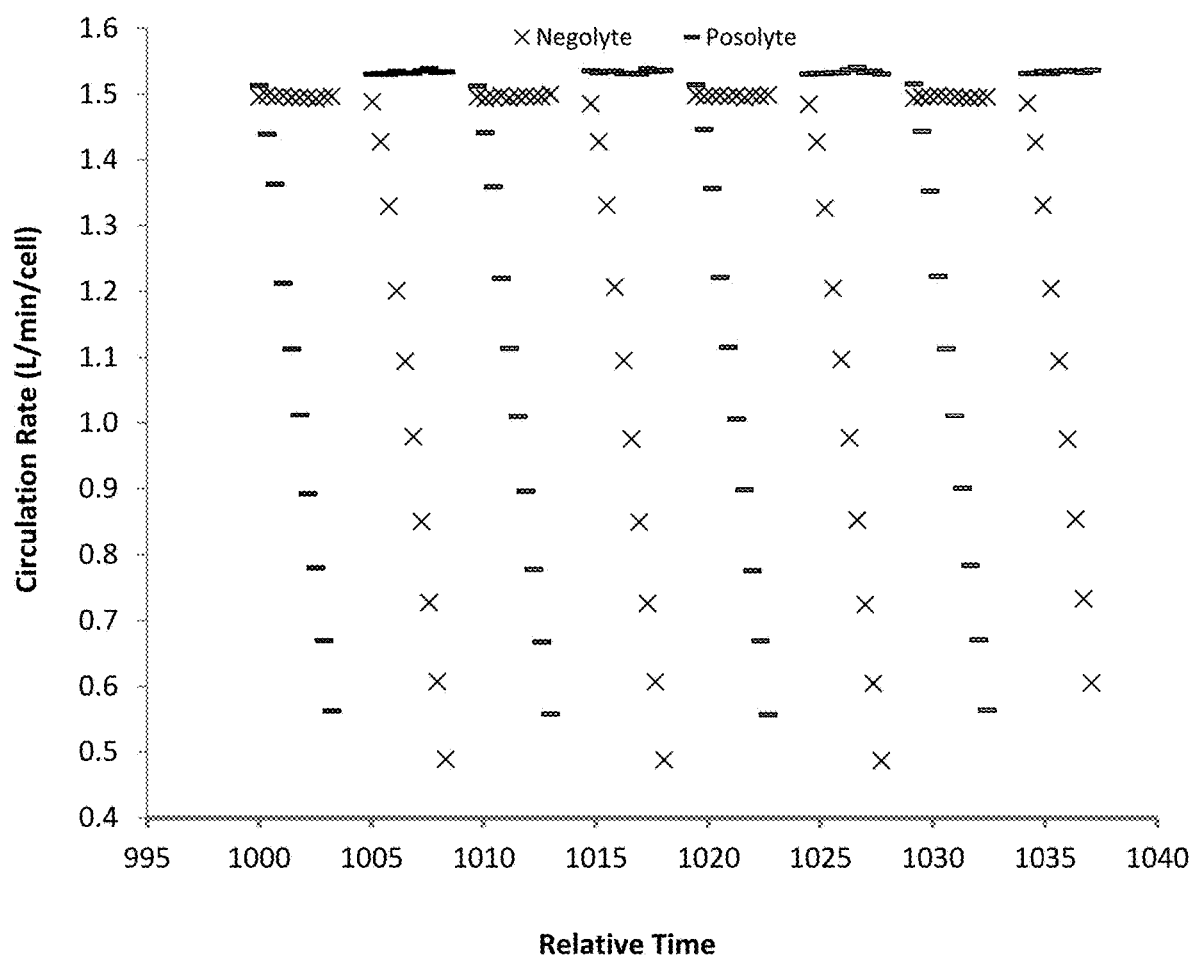

FIGS. 5A and 5B show illustrative plots demonstrating how the total loss function in a flow battery system can be minimized over time. As shown in FIG. 5B, the circulation rate of the first electrolyte solution was held constant and the circulation rate of the second electrolyte solution was then swept through a range of values until a minimum value of the total loss function occurred at a corresponding relative time, as shown in FIG. 5A. After finding the optimal circulation rate for the second electrolyte solution, the process was repeated by holding the circulation rate of the second electrolyte solution constant and sweeping the circulation rate of the first electrolyte solution through a range of values until the overall loss function was again minimized. The current density was held at 150 mA/cm$^2$ in all cases.

As shown in FIG. 5A, the first two circulation sweeps (curves A and B) produced total loss function minima at power values that were very similar to one another. The similarity is believed to be due to the electrolyte solutions being at state of charge values at the two relative times where operating efficiency does not vary significantly with differing state of charge values. At greater relative times, however, the observed minimum power values of the total loss function increased, which is believed to be indicative of the changing state of charge of the electrolyte solutions. For example, curves C and D exhibited power minima that were again similar to one another, but higher than the minima of curves A and B. Curves E-H exhibited higher power minima still, and there was less similarity in the power minima between curves E/F and G/H than was observed at earlier relative times. This is believed to be due the electrolyte solutions reaching state of charges where the operating efficiency is sharply impacted by changing state of charge values. The impact of state of charge upon optimal electrolyte circulation rates is shown in FIGS. 6A-6D.

Figure 6A:
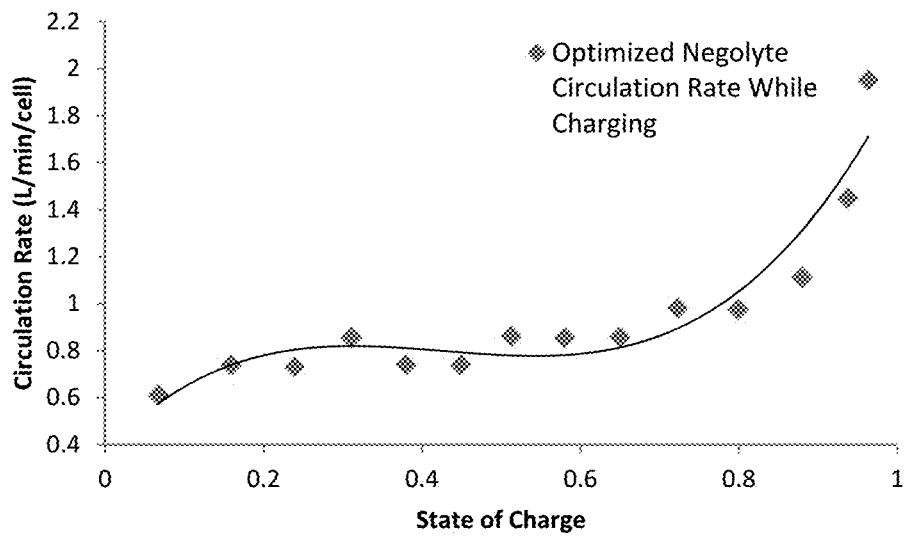
FIGS. 6A-6D show illustrative plots demonstrating how optimal circulation rates for the negolyte solution and the posolyte solution vary with state of charge during charging and discharging cycles.
Figure 6B:
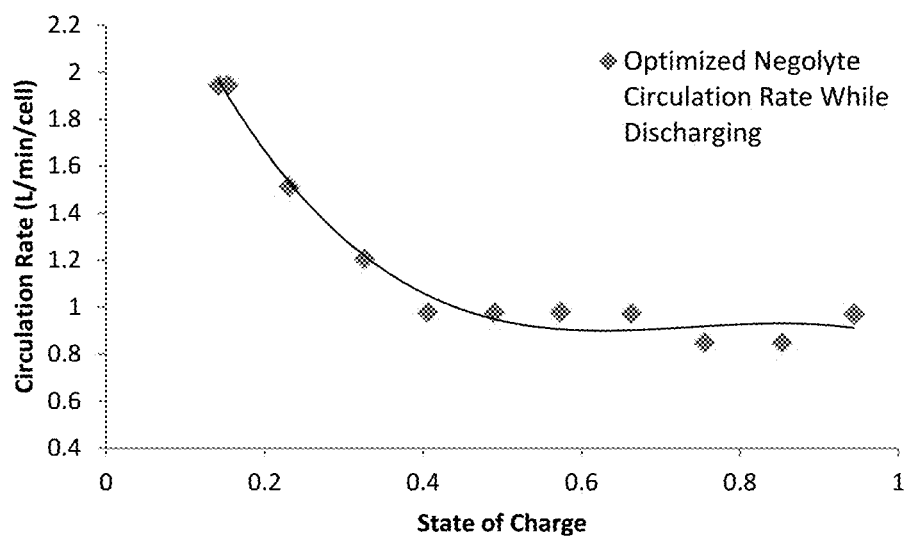
Figure 6C:
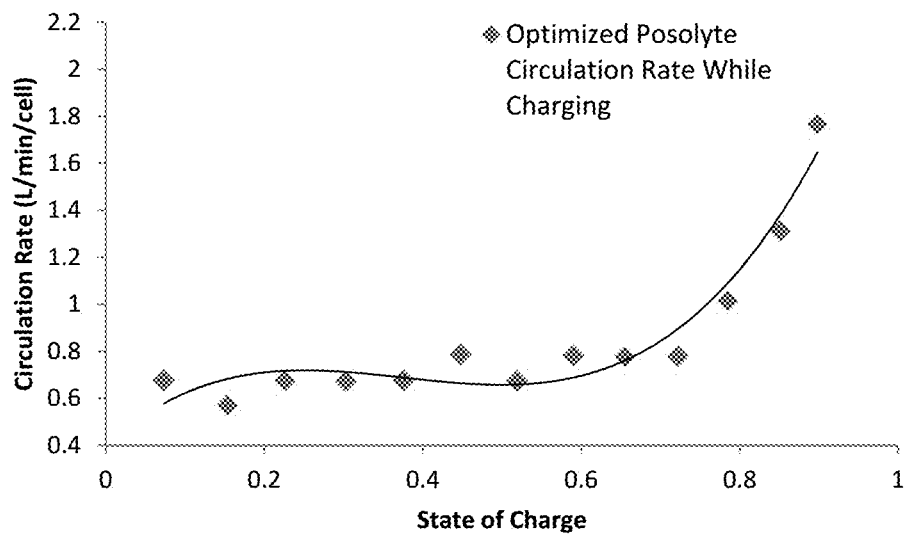
Figure 6D:
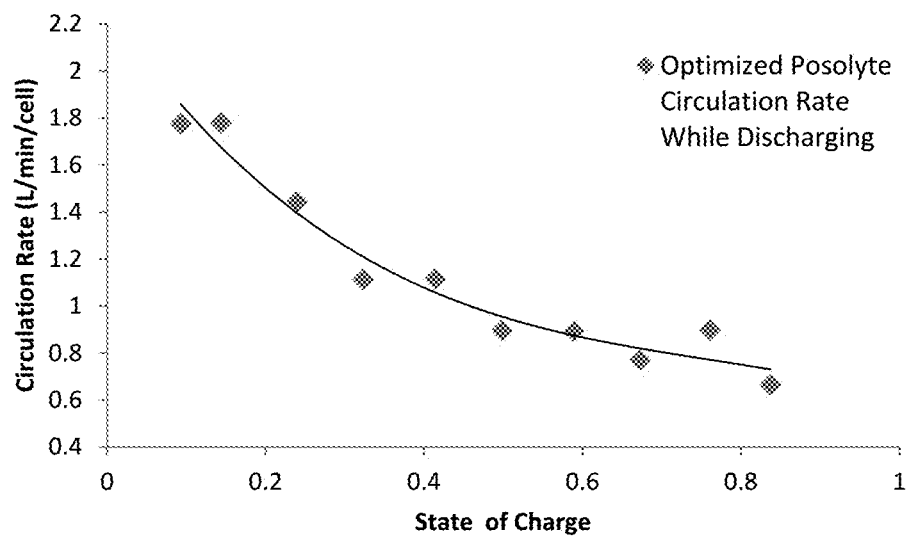

FIGS. 6A-6D show illustrative plots demonstrating how optimal circulation rates for the negolyte solution and the posolyte solution vary with state of charge during charging and discharging cycles. As shown in FIGS. 6A and 6B, the optimal negolyte circulation rates differed somewhat depending upon whether the flow battery system was in a charging cycle or a discharging cycle. There was similar variance in the optimal posolyte circulation values at different state of charge values, as shown in FIGS. 6C and 6D. All of the curves showed more extreme variance in the optimal circulation rates when the electrolyte solutions approached a state of full charge or full discharge.

Figure 7:
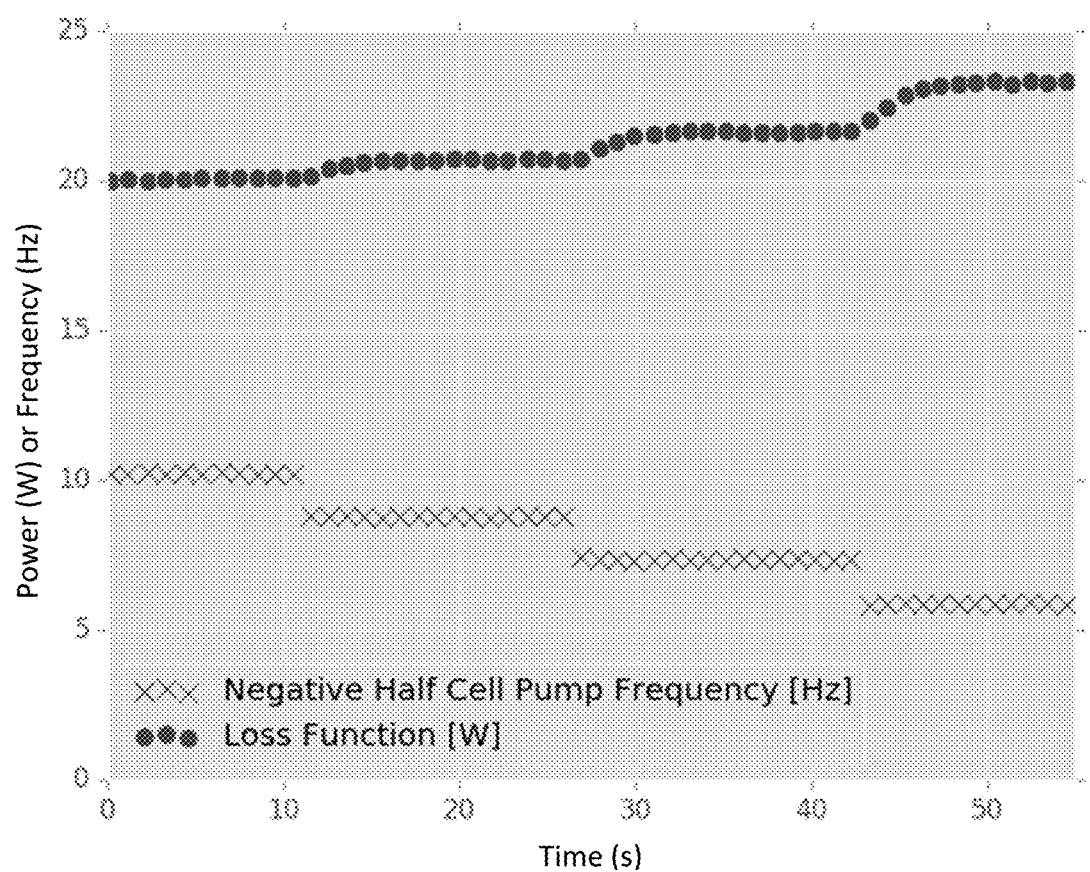
FIG. 7 shows an illustrative plot of the resistive loss function and pump frequency in a flow battery system as a function of time.

FIG. 7 shows an illustrative plot of the resistive loss function and pump frequency in a flow battery system as a function of time. As shown in FIG. 7, a change in pump frequency produced a very rapid corresponding response in the resistive loss function.

Although the disclosure has been described with reference to the disclosed embodiments, those skilled in the art will readily appreciate that these are only illustrative of the disclosure. It should be understood that various modifications can be made without departing from the spirit of the disclosure. The disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description.

What is claimed is the following:

1. A flow battery system comprising:
    a first half-cell containing a first electrolyte solution;
    a second half-cell containing a second electrolyte solution:
        wherein the first half-cell and the second half-cell collectively define a whole cell;
    at least one pump configured to circulate the first electrolyte solution through the first half-cell and the second electrolyte solution through the second half-cell; and
    at least one sensor configured to measure an amount of net electrical power entering the flow battery system in a charging mode and/or exiting the flow battery system in a discharging mode and an amount of electrical current (I) passing through the whole cell;
    wherein the at least one pump is configured to provide a circulation rate through at least one of the first half-cell and the second half-cell that is adjustable in response to feedback from the at least one sensor based on a value of $P_{exit}/I$ or $I/P_{enter}$;
    wherein
        I is electrical current passing through the whole cell,
        $P_{exit}$ is net electrical power exiting the flow battery system in a discharging mode, that includes power received from the flow battery less power used for operating the pumps and
        $P_{enter}$ is net electrical power entering the flow battery system in a charging mode that includes power supplied to the flow battery plus power used for operating the pumps.

2. The flow battery system of claim 1, wherein the at least one pump and the at least one sensor are in electronic communication with one another, and the at least one pump is configured to adjust the circulation rate through at least one of the first half-cell and the second half-cell in response to an input from the at least one sensor.

3. The flow battery system of claim 1, wherein the at least one sensor comprises a single sensor configured to measure both the amount of net electrical power entering or exiting the flow battery system and the amount of electrical current passing through the whole cell.

4. The flow battery system of claim 3, wherein the at least one sensor is a multimeter.

5. The flow battery system of claim 1, wherein the at least one sensor comprises two or more sensors configured to measure separately the amount of net electrical power entering or exiting the flow battery system, and the amount of electrical current passing through the whole cell.

6. The flow battery system of claim 5, wherein the two or more sensors are a watt-meter and an ammeter.

7. The flow battery system of claim 1, wherein the at least one pump is a first pump configured to circulate the first electrolyte solution through the first half-cell at a first circulation rate and a second pump configured to circulate the second electrolyte solution through the second half-cell at a second circulation rate.

8. The flow battery system of claim 7, wherein the first pump is configured to adjust the first circulation rate until $P_{exit}/I$ or $I/P_{enter}$ reaches a maximum value, and the second pump is configured to adjust the second circulation rate until $P_{exit}/I$ or $I/P_{enter}$ reaches a maximum value.

9. The flow battery system of claim 1, wherein the at least one pump is configured to adjust the circulation rate through each half-cell until $P_{exit}/I$ or $I/P_{enter}$ reaches a maximum value.

10. A method of operating a flow battery system, the flow battery system comprising:
 a first half-cell containing a first electrolyte solution, and a second half-cell containing a second electrolyte solution;
  wherein the first half-cell and the second half-cell collectively define a whole cell;
 at least one pump configured to circulate the first electrolyte solution through the first half-cell and the second electrolyte solution through the second half-cell; and
 at least one sensor configured to measure an amount of net electrical power entering the flow battery system in a charging mode and/or exiting the flow battery system in a discharging mode and an amount of electrical current (I) passing through the whole cell;
 wherein the at least one pump is configured to provide a circulation rate through at least one of the first half-cell and the second half-cell that is adjustable in response to feedback based on a value of $P_{exit}/I$ or $I/P_{enter}$;
 the method comprising:
 circulating the first electrolyte solution through the first half-cell and the second electrolyte solution through the second half-cell; and either
 (a)(i) measuring an amount of net electrical power entering or exiting the flow battery system, and an amount of electrical current passing through the whole cell; and
 (ii) adjusting a circulation rate through at least one of the first half-cell and the second half-cell until increasing values of $P_{exit}/I$ or $I/P_{enter}$ occur; or
 (b)(i) measuring an amount of net electrical power entering or exiting the flow battery system, and an amount of electrical current passing through the whole cell, and an amount of electrical current passing through the whole cell; and
 (ii) adjusting a circulation rate through at least one of the first half-cell and the second half-cell in response to decreasing values of $P_{exit}/I$ or $I/P_{enter}$;
 wherein I is electrical current passing through the whole cell, $P_{exit}$ is net electrical power exiting the flow battery system in a discharging mode that includes power received from the flow battery less power used for operating the pumps, and enter is $P_{enter}$ is net electrical power entering the flow battery system in a charging mode that includes power supplied to the flow battery plus power used for operating the pumps.

11. The method of claim 10, wherein the first electrolyte solution is circulated through the first half-cell at a first circulation rate and the second electrolyte solution is circulated through the second half-cell at a second circulation rate.

12. The method of claim 11, wherein the first electrolyte solution is circulated through the first half-cell using a first pump and the second electrolyte solution is circulated through the second half-cell using a second pump, each pump being configured to provide a circulation rate that is adjustable.

13. The method of claim 12, wherein adjusting the circulation rate comprises adjusting the first circulation rate and the second circulation rate sequentially or iteratively.

14. The method of claim 13, wherein the first circulation rate and the second circulation rate are adjusted until a maximum value of $P_{exit}/I$ or $I/P_{enter}$ occurs.

15. The method of claim 12, wherein adjusting the circulation rate comprises adjusting at least one of the first circulation rate and the second circulation rate until a maximum value of $P_{exit}/I$ or $I/P_{enter}$ occurs.

16. The method of claim 10, wherein the circulation rate through each half-cell is adjusted until a maximum value of $P_{exit}/I$ or $I/P_{enter}$ occurs.

17. The method of claim 10, wherein the amount of net electrical power entering or exiting the flow battery system and the amount of electrical current passing through the whole cell are measured using at least one sensor.

18. The method of claim 17, wherein the at least one sensor is in electronic communication with at least one pump configured to provide a circulation rate that is adjustable, and the at least one pump is responsive to an input from the at least one sensor.

19. The method of claim 18, wherein the at least one pump is a first pump configured to circulate the first electrolyte solution through the first half-cell at a first circulation rate and a second pump configured to circulate the second electrolyte solution through the second half-cell at a second circulation rate.

20. The method of claim 19, wherein adjusting the circulation rate comprises adjusting at least one of the first circulation rate and the second circulation rate until a maximum value of $P_{exit}/I$ or $I/P_{enter}$ occurs.

21. The method of claim 10, wherein values for I and $P_{exit}$ or $P_{enter}$ are measured and compared to values in a lookup table for each electrolyte solution, the lookup table for each electrolyte solution containing a recommended circulation rate for multiple pairs of values for I and $P_{exit}$ or $P_{enter}$; and
 wherein the circulation rate for at least one of the first electrolyte solution and the second electrolyte solution is adjusted manually based on the recommended circulation rate obtained from the lookup table for each electrolyte solution.

22. The method of claim 21, wherein the first electrolyte solution is circulated through the first half-cell using a first pump and the second electrolyte solution is circulated through the second half-cell using a second pump, each pump being configured to provide a circulation rate that is adjustable.

23. The method of claim 22, wherein adjusting the circulation rate comprises adjusting at least one of the first circulation rate and the second circulation rate until a maximum value of $P_{exit}/I$ or $I/P_{enter}$ occurs.

24. A method of operating a flow battery system, the flow battery system comprising:
a first half-cell containing a first electrolyte solution, and
a second half-cell containing a second electrolyte solution;
wherein the first half-cell and the second half-cell collectively define a whole cell;
at least one pump configured to circulate the first electrolyte solution through the first half-cell and the second electrolyte solution through the second half-cell; and
at least one sensor configured to measure an amount of net electrical power entering the flow battery system in a charging mode and/or exiting the flow battery system in a discharging mode and an amount of electrical current (I) passing through the whole cell in real time;
the method comprising:
circulating the first electrolyte solution through the first half-cell and the second electrolyte solution through the second half-cell:
measuring an amount of net electrical power entering or exiting the flow battery system, and an amount of electrical current passing through the whole cell; and
adjusting a circulation rate through at least one of the first half-cell and the second half-cell in response to decreasing values of $P_{exit}/I$ or $I/P_{enter}$;
wherein I is electrical current passing through the whole cell $P_{exit}$ is net electrical power exiting the flow battery system in a discharging mode that includes power received from the flow battery less power used for operating the pumps, and enter is $P_{enter}$ is net electrical power entering the flow battery system in a charging mode that includes power supplied to the flow battery plus power used for operating the pumps.

* * * * *

UNITED STATES PATENT AND TRADEMARK OFFICE
CERTIFICATE OF CORRECTION

PATENT NO. : 10,903,511 B2
APPLICATION NO. : 15/364206
DATED : January 26, 2021
INVENTOR(S) : Morris-Cohen Page 1 of 1

It is certified that error appears in the above-identified patent and that said Letters Patent is hereby corrected as shown below:

In the Claims

Under Column nos. 25-26, Claim no. 10, Line nos. 67-3, Replace:
"and an amount of electrical current passing through the whole cell, and an amount of electrical current passing through the whole cell; and"
With:
--and an amount of electrical current passing through the whole cell; and--

Under Column no. 26, Claim no. 10, Line no. 11, Replace:
"operating the pumps, and enter is P $_{enter}$ is net electrical"
With:
--operating the pumps, and P $_{enter}$ is net electrical--

Under Column no. 28, Claim no. 24, Line no. 18, Replace:
"operating the pumps, and enter is P $_{enter}$ is net electrical"
With:
--operating the pumps, and P $_{enter}$ is net electrical--

Signed and Sealed this
Fourth Day of May, 2021

Drew Hirshfeld
*Performing the Functions and Duties of the
Under Secretary of Commerce for Intellectual Property and
Director of the United States Patent and Trademark Office*